United States Patent
Yoshizawa et al.

(10) Patent No.: US 7,695,848 B2
(45) Date of Patent: Apr. 13, 2010

(54) FUEL CELL STACK

(75) Inventors: Atsuhito Yoshizawa, Yokohama (JP); Satoshi Mogi, Yamato (JP); Jun Yamamoto, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/396,753

(22) Filed: Mar. 3, 2009

(65) Prior Publication Data

US 2009/0233147 A1 Sep. 17, 2009

(30) Foreign Application Priority Data

Mar. 11, 2008 (JP) .............................. 2008-060570

(51) Int. Cl.
*H01M 8/04* (2006.01)
(52) U.S. Cl. .......................................... 429/38; 429/39
(58) Field of Classification Search .................... None
See application file for complete search history.

(56) References Cited

U.S. PATENT DOCUMENTS

2004/0038103 A1* 2/2004 Wariishi et al. ............... 429/32
2005/0019639 A1 1/2005 Nakakubo et al.
2005/0238943 A1 10/2005 Akiyama et al.
2007/0148531 A1 6/2007 Yoshizawa et al.
2007/0190383 A1 8/2007 Mogi et al.
2007/0248870 A1 10/2007 Mogi et al.
2008/0152973 A1 6/2008 Mogi
2009/0029220 A1 1/2009 Yoshizawa et al.

FOREIGN PATENT DOCUMENTS

JP 2004-311279 A 11/2004
JP 2005-340173 A 12/2005

\* cited by examiner

*Primary Examiner*—John S Maples
(74) *Attorney, Agent, or Firm*—Fitzpatrick, Cella, Harper & Scinto

(57) ABSTRACT

A fuel cell stack in which at least one of a plurality of fuel cell units constituting a fuel cell stack includes a water absorbing member with a surface exposed to the atmosphere in a portion where an oxidizer flow path forming member and a separator are in contact with each other, and an area of a surface exposed to the atmosphere of the water absorbing member of the fuel cell unit the temperature of which becomes relatively lower is larger than an area of a surface exposed to the atmosphere of the water absorbing member of the fuel cell unit the temperature of which becomes relatively higher.

10 Claims, 18 Drawing Sheets

CELL UNIT No. 8
CELL UNIT No. 7
CELL UNIT No. 6
CELL UNIT No. 5
CELL UNIT No. 4
CELL UNIT No. 3
CELL UNIT No. 2
CELL UNIT No. 1

FUEL CELL STACK

BACKGROUND OF THE INVENTION

1. Field of the Invention

The present invention relates to a fuel cell stack, and more particularly, to a fuel cell stack in which water discharge ability and water holding property of an oxidizer flow path of a fuel cell unit in the stack are designed depending on the temperature distribution during electrical power generation.

2. Description of the Related Art

The polymer electrolyte fuel cell basically includes a polymer electrolyte membrane having proton conductivity and a pair of catalyst layers and electrodes provided on both surfaces of the polymer electrolyte membrane.

The catalyst layer generally includes a catalyst layer made of platinum or a platinum group metal catalyst. A gas diffusion layer is provided on the outside of the catalyst layer, for supplying a gas and collecting current.

An assembly in which the polymer electrolyte membrane and the catalyst layers are integrated into one is referred to as a membrane electrode assembly (MEA), and a fuel (hydrogen) is supplied to one of the electrodes and an oxidizer (oxygen) is supplied to another electrode to perform power generation in the process of generating water.

The electrode that is supplied with the fuel is called a fuel electrode, and the electrode that is supplied with an oxidizer is called an oxidizer electrode. Electrical power is drawn from the electrodes located on both sides.

Although the theoretical voltage of a fuel cell unit having one membrane electrode assembly is about 1.23 V, there are many cases where a fuel cell unit is driven at about 0.7 V in a normal operation state, and a part of the reaction energy is converted into heat.

Accordingly, in a case where a higher activation voltage is required, a plurality of fuel cell units are stacked, and the respective fuel cell units are electrically connected in series and used.

This type of stack structure is called a fuel cell stack. In the stack, normally, an oxidizer flow path and a fuel path are isolated by a member called as a separator. Each of the plate-shaped separators is provided with a recessed portion and a protruding portion. A recessed portion facing the membrane electrode assembly is used as a gas flow path, and a protruding portion is used as a current collecting portion.

In such a fuel cell stack, a plurality of fuel cell units generate electrical power simultaneously, and the ratio of heat radiation varies depending upon respective portions of the stack because of the stack structure. The heat generated accompanying the electrical power generation is more likely to stay in the fuel cell unit located at the center of the stack, and is more likely to be released from fuel cell units located at either end. Therefore, a temperature distribution is generated in the stack direction such that the temperature is the highest at the center and is relatively lower at both ends. Due to such a temperature distribution, the respective fuel cell units of the fuel cell stack generate electrical power under different temperature conditions.

Therefore, the following inconveniences are likely to occur.

First, flooding is more likely to occur in fuel cell units located at both ends in the stack direction. Flooding is a phenomenon in which water generated at the oxidizer electrode condenses to decrease the gas diffusion of the oxidizer electrode, which degrades fuel cell characteristics. When a temperature distribution is generated in the stack, since water is more likely to condense in fuel cell units having lower temperatures, flooding is more likely to occur in fuel cell units located at the ends.

Furthermore, a dry-out is more likely to occur at the cell units located at the central part in the stacking direction. The dry-out is a phenomenon in which the water content in the polymer electrolyte decreases with the temperature increase, resulting in the internal resistance in the cell unit, which causes a degradation of the fuel cell characteristics.

The dry-out phenomenon is likely to occur at a position where the temperature is sufficiently high so that water generated at the oxidizer electrode does not condense, but is transpired.

In order to eliminate the instability of the characteristics due to such temperature distribution, Japanese Patent Application Laid-Open No. 2005-340173 proposes a fuel cell stack in which there is a distribution in the amount of air provided to each cell unit of a fuel cell stack.

Specifically, the sectional area of an oxidizer flow path formed in a separator of each cell unit, which has a low temperature and is located at an end, is set to be the largest.

By virtue of this structure, the amount of air supplied at both ends becomes large. Therefore, even when the temperature is lower, water hardly condenses, so that the variation in the degree of flooding in the stacking direction is reduced.

Furthermore, Japanese Patent Application Laid-open No. 2004-311279 proposes the following fuel cell. The fuel cell is configured such that the pressure loss of the gas in fuel cell units at both ends of a fuel cell stack is set to be smaller than in the other fuel cell units, whereby a decrease in the ability to discharge generated of water in the fuel cell units at both ends of the stack having lower temperatures and the inconvenience, such as blocking a gas flow path involved therein, can be suppressed.

However, the above-mentioned conventional examples disclosed in Japanese Patent Application Laid-open Nos. 2005-340173 and 2004-311279 have the following problems.

In the fuel cell stacks with configurations disclosed in Japanese Patent Application Laid-open Nos. 2005-340173 and 2004-311279, in order to discharge generated water and to reduce the variation in temperature, it is necessary to generate the flow of an oxidizer with a blower or the like.

More specifically, it is necessary to set auxiliary devices, such as an air circulation mechanism and a blower, and to supply electrical power for driving the auxiliary devices.

Thus, for example, in mobile applications and the like, where the size of the fuel cell system needs to be reduced as much as possible, this creates problems in terms of the size and weight.

SUMMARY OF THE INVENTION

The present invention relates to a fuel cell stack having a structure, which does not require an air circulation mechanism and the like and which can attend to flooding and dry-out caused by a temperature distribution in a stack direction under natural diffusion or a flow of a minimum amount of oxidizer.

That is, the present invention provides a fuel cell stack, including a plurality of stacked fuel cell units, each of the fuel cell units including a membrane electrode assembly in which a fuel electrode and an oxidizer electrode are disposed on both sides of a polymer electrolyte membrane; an oxidizer flow path forming member, which is disposed on the oxidizer electrode side of the membrane electrode assembly and which includes an opening for supplying an oxidizer therethrough; and a separator disposed in contact with a surface opposite to a surface being in contact with the oxidizer electrode of the oxidizer flow path forming member. At least one of the plurality of fuel cell units constituting the fuel cell stack includes a water absorbing member having a surface exposed to the atmosphere in a portion where the oxidizer flow path forming member and the separator are in contact with each other. An area of the surface exposed to the atmosphere of the water absorbing member of the fuel cell unit of the plurality of fuel cell units constituting the fuel cell stack the temperature of which becomes relatively lower is larger than an area exposed to the atmosphere of the water absorbing member of the fuel cell unit the temperature of which becomes relatively higher.

Furthermore, the present invention provides a fuel cell stack, wherein the fuel cell units located at both ends of the stack have an area of a surface exposed to the atmosphere of the water absorbing member, which area is larger than that of the fuel cell unit on an inner side of the fuel cell stack.

Furthermore, the present invention provides a fuel cell stack, wherein the difference in the area of the surfaces exposed to the atmosphere between the fuel cell units located at both ends and inside the stack corresponds to a difference in the area of a portion in which both ends of the water absorbing member protrude outward from the opening of the oxidizer flow path forming member.

Furthermore, the present invention provides a fuel cell stack, wherein the difference in the area of the surfaces exposed to the atmosphere between the fuel cell units located at both ends and inside the stack corresponds to a difference in the area of a portion in which both ends of the water absorbing member are exposed to the atmosphere from the oxidizer flow path forming member in a portion in which both ends of the water absorbing member are in contact with the separator.

Furthermore, the present invention provides a fuel cell stack, wherein the fuel cell unit on an innermost side, which constitutes the fuel cell stack, is a fuel cell unit in which the water absorbing member is provided on an inner side from both ends on the opening side of the oxidizer flow path forming member.

Furthermore, the present invention provides a fuel cell stack, wherein the fuel cell unit on an innermost side, which constitutes the fuel cell stack, is a fuel cell unit in which the water absorbing member is not provided.

Furthermore, the present invention provides a fuel cell stack, wherein the oxidizer flow path forming member is formed of a metal foam.

Furthermore, the present invention provides a fuel cell stack, wherein the water absorbing member is formed of fibers that have a dry rate of 80% or more, the dry rate being a ratio of water transpired within one hour of water absorbed by the water absorbing member in an atmosphere with a temperature of 25° C. and a relative humidity of 50%, and that have a water suction height in 10 seconds of 40 mm or more when an end of the fiber is dipped in water.

Furthermore, the present invention provides a fuel cell stack, wherein the water absorbing member disposed in the fuel cell unit in the uppermost portion in a gravity direction is exposed outside of the fuel cell unit and is in contact with a stack constituting member the temperature of which is higher than outside temperature.

Furthermore, the present invention provides a fuel cell stack including a plurality of stacked fuel cell units, each of the fuel cell units including a membrane electrode assembly in which a fuel electrode and an oxidizer electrode are disposed on both sides of a polymer electrolyte membrane; an oxidizer flow path forming member, which is disposed on the oxidizer electrode side of the membrane electrode assembly and includes an opening for supplying an oxidizer therethrough; and a separator disposed in contact with a surface opposite to a surface being in contact with the oxidizer electrode of the oxidizer flow path forming member. At least one of the plurality of fuel cell units constituting the fuel cell stack includes a water absorbing member having a surface exposed to the atmosphere in a portion where the oxidizer flow path forming member and the separator are in contact with each other. The fuel cell units located at both ends of the plurality of fuel cell units constituting the fuel cell stack have an area of a surface exposed to the atmosphere of the water absorbing member, which is larger than that of the fuel cell unit located on an inner side of the plurality of fuel cell units constituting the fuel cell stack.

According to the present invention, there can be realized a fuel cell stack having a structure, which does not require an air circulation mechanism and the like, and can attend to flooding and dry-out caused by a temperature distribution in a stack direction under natural diffusion or a flow of a minimum amount of the oxidizer.

Other features of the present invention become apparent from the following description of exemplary embodiments with reference to the accompanying drawings.

DESCRIPTION OF THE EMBODIMENTS

A fuel cell stack in accordance with an embodiment of the present invention is described.

First, the configuration of a fuel cell unit constituting the fuel cell stack in this embodiment is described.

Figure 1:
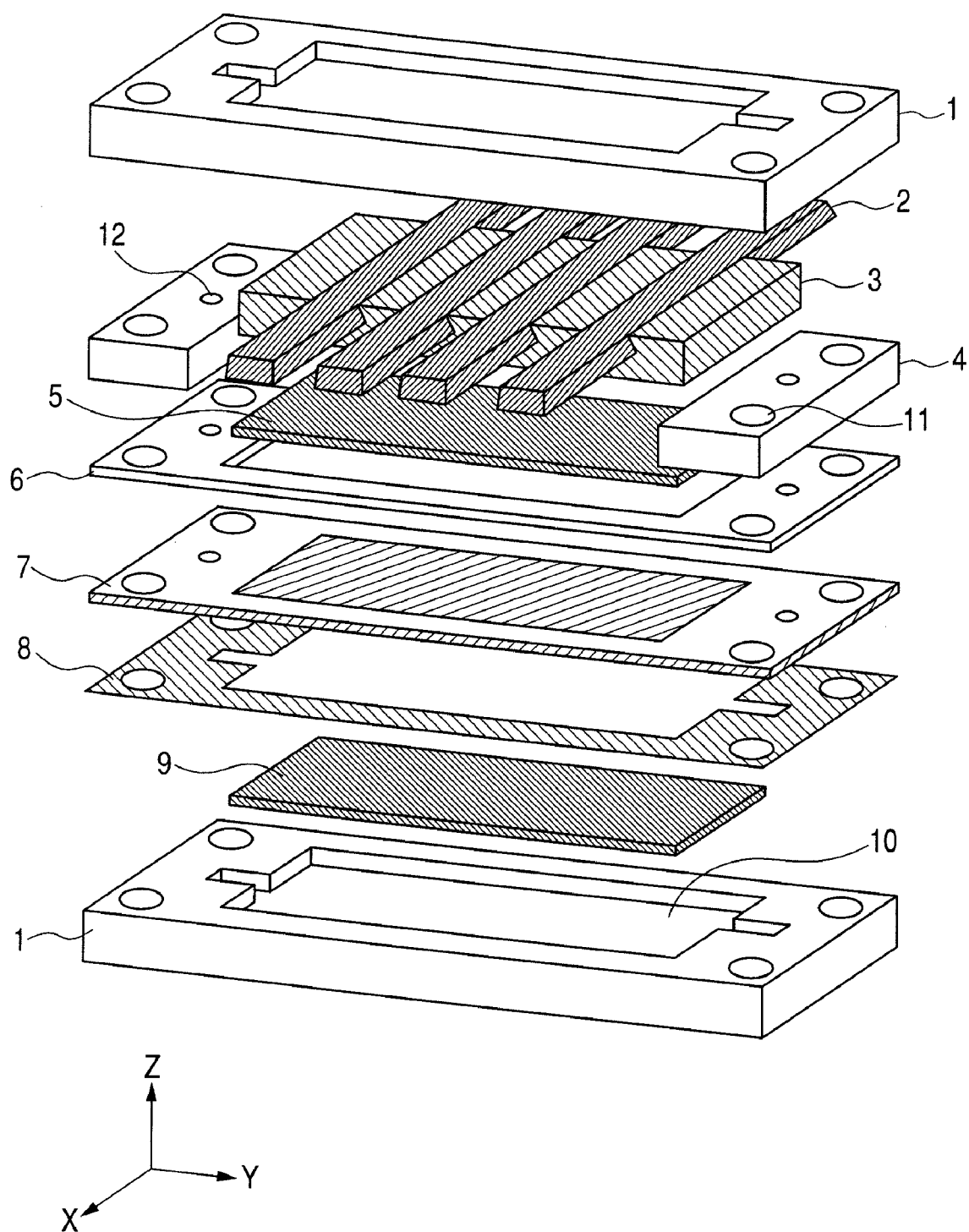
FIG. 1 is a schematic exploded perspective view illustrating the configuration of a fuel cell unit constituting a fuel cell stack in accordance with an embodiment of the present invention.

FIG. 1 is an exploded perspective view illustrating the configuration of a fuel cell unit constituting the fuel cell stack in accordance with this embodiment.

FIG. 1 illustrates separators 1, a water absorbing member 2, an oxidizer flow path forming member 3, a structure retaining member 4, an oxidizer electrode side gas diffusion layer 5, a support member 6, a membrane electrode assembly 7, a sealing material 8, a fuel electrode side gas diffusion layer 9, and a fuel electrode chamber 10.

The fuel cell unit constituting the fuel cell stack in accordance with this embodiment includes the separator 1, the fuel electrode side gas diffusion layer 9 and the sealing material 8 on the fuel electrode side, and the oxidizer electrode side gas diffusion layer 5, the oxidizer flow path forming member 3, the water absorbing member 2, the support member 6, the structure retaining member 4 and the separator 1 on the oxidizer electrode side in such a manner that the membrane electrode assembly 7 is sandwiched by those elements.

The separator 1 is formed by plating a metal plate, such as a conductive stainless steel plate, with gold, and it is disposed in contact with a surface opposite to a surface being in contact with the oxidizer electrode of the oxidizer flow path forming member 3.

Furthermore, the fuel electrode chamber 10 is provided at a position corresponding to the fuel electrode.

The fuel electrode side gas diffusion layer 9 is a conductive member with air permeability, such as carbon paper and carbon cloth, and is contained in the fuel electrode chamber.

The sealing material 8 has a sealing function and is disposed so as to surround the outer periphery of an electrode plate. The sealing material 8 forms a sealed space between the membrane electrode assembly 7 and the separator 1 at the time of binding, thereby preventing hydrogen from leaking from the fuel electrode chamber.

As the sealing material, a gasket, an O-ring, or the like may be used.

Furthermore, an adhesive or the like that bonds the membrane electrode assembly to the electrode plate may be used, and a hot-melt type adhesive sheet or the like may be used. The oxidizer electrode side gas diffusion layer 5 and the oxidizer flow path forming member 3 are stacked on the oxidizer electrode side.

As the oxidizer electrode side gas diffusion layer 5, carbon paper, carbon cloth, or the like may be used as is the case with the fuel electrode side gas diffusion layer 9 on the fuel electrode side.

The oxidizer flow path forming member 3 is a porous base having electrical conductivity, and a metal foam obtained by porosifying a metal, such as stainless steel, nickel, or chromium, may be preferably used because of its excellent ability to form highly uniform flow paths and to transmit clamping pressure.

Figure 2:
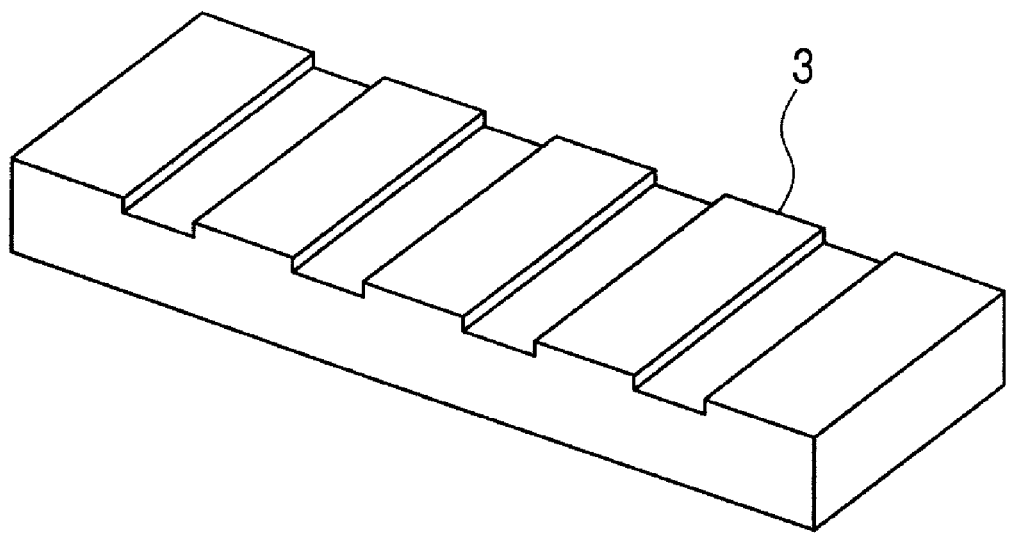
FIG. 2 is a schematic perspective view of an oxidizer flow path forming member having grooves formed on a side to be brought into contact with a separator used for a fuel cell unit in accordance with an embodiment of the present invention.

Grooves are formed on a surface of the oxidizer flow path forming member 3 that is to be brought into contact with the separator 1 as illustrated in FIG. 2. The water absorbing member 2 is disposed in a contact portion between the oxidizer flow path forming member 3 and the separator 1 in the grooves.

The oxidizer flow path forming member 3 has an open side surface on a plane perpendicular to the X-axis indicated in FIG. 1. Air in the atmosphere is supplied through the open side surface.

Due to the generation of electrical power, water is generated as vapor from the oxidizer electrode and condenses in the separator 1 to become a liquid. The water absorbing member 2 disposed in the contact portion between the oxidizer flow path forming member 3 and the separator 1 absorbs condensed water, thereby preventing water from being retained and flooding the oxidizer flow path forming member 3. At this time, since the water absorbing member 2 has a surface exposed to the atmosphere, the absorbed generated water is transpired to the atmosphere through the surface exposed to the atmosphere and discharged.

Therefore, the water absorbing member 2 is required to have a high transpiration ability, and it is desirable from the viewpoint of a water discharge ability that the dry ratio after one hour in an atmosphere at a temperature of 25° C. and a relative humidity of 50% is 80% or more. The term "dry ratio after one hour" herein employed refers to a ratio of water absorbed by the water absorbing member to be transpired in one hour.

More specifically, the dry ratio is represented by the percentage of water transpired in one hour of the water absorbed by the water absorbing member.

For example, in the case where the weight of the water absorbing member is 1 g, the weight of the absorbed water is 2 g, the total weight is 3 g, and the total weight after one hour is 1.5 g, the weight of the water released by transpiration in one hour is 1.5 g. Thus, the dry ratio is 1.5÷2×100=75(%).

Furthermore, the water is driven to the surface exposed to the atmosphere by a capillary phenomenon.

Therefore, the water absorbing member 2 needs to be a member exhibiting a capillary phenomenon. For example, it is desirable that the water absorbing member 2 be composed of a fiber or the like that guides generated water, in which the suction height in 10 seconds when an end of the fiber is dipped in water is 40 mm or more.

Examples of the materials that have such characteristics and may be used as the water absorbing member 2 include a polyimide, polyvinyl alcohol, a polyester, polyethylene, and polypropylene.

The support member 6 surrounds the contact portion between the fuel electrode side gas diffusion layer 9 and the membrane electrode assembly 7 and is disposed at a position corresponding to the sealing member 8 on the fuel electrode side.

The material for the support member 6 is not required to have conductivity but is required to have high corrosion resistance and rigidity. Metals such as stainless steel, or ceramics or plastics may be used.

Furthermore, the surface in contact with the membrane electrode assembly 7 of the support member 6 is required to have high flatness. The reason for this is to make the clamping pressure to the sealing member 8 more uniform at the time of clamping the fuel cell units.

Furthermore, by setting the thickness of the support member 6 to be sufficiently smaller compared with the thickness of the flow path forming member 3, sufficient air inflow through the side surfaces of the oxidizer flow path forming member 3 may be ensured.

The structure retaining member 4 is formed of a member with a rigidity, which is at least greater than that of the oxidizer flow path forming member 3, and defines the height of the fuel cell unit and the thicknesses of the oxidizer electrode side gas diffusion layer 5 and the oxidizer flow path forming member 3, thereby preventing excess deformation of the oxidizer electrode side gas diffusion layer 5 and the oxidizer flow path forming member 3.

Furthermore, the structure retaining member 4 has bolt holes 11.

Furthermore, the structure retaining member 4 is provided with fuel flow paths 12, which become fuel manifolds in the stack direction of the fuel cell units after the fuel cell stack is configured.

In order to prevent the leakage of the fuel from the fuel manifolds, it is desirable to insert a sealing member appropriately between the respective structural members depending upon the type of the fuel used.

The fuel manifolds thus formed are made of the structure retaining member 4 with a high rigidity. Therefore, the fuel manifolds can prevent the leakage of a fuel due to the deformation and the positional shift during or after the clamping.

Examples of the highly rigid material that may be used for the structure retaining member 4 include metals, such as stainless steel, ceramics, and plastics.

When the structure retaining member 4 is provided on the support member 6, the clamping pressure is transmitted to the support member through the structure retaining member, whereby the alignment accuracy of the support member is enhanced.

Although the structure retaining member 4 and the support member 6 may be configured separately, if they are configured integrally, the alignment operation in the production steps of a fuel cell may be further reduced.

In this embodiment, when a plurality of fuel cell units with the above-mentioned structure are stacked to configure a fuel cell stack, at least one of the fuel cell units is configured so as to have a water absorbing member provided with a surface exposed to the atmosphere in a contact portion between the oxidizer flow path forming member and the separator.

Then, in the fuel cell unit the temperature of which becomes relatively lower, the area of the surface of the water absorbing member exposed to the atmosphere is set to be large, whereby the ability to transpire and discharge generated water absorbed by the water absorbing member are increased. In contrast, in the fuel cell unit in which the temperature becomes relatively higher, the area of the surface of the water absorbing member exposed to the atmosphere is set to be small, whereby the ability to transpire and discharge generated water absorbed by the water absorbing member is decreased.

At this time, the water absorbing member may be configured such that grooves are provided in a contact portion between the oxidizer flow path forming member and the separator in the air inflow direction.

Due to the generation of electrical power, water is generated as vapor from the oxidizer electrode and condenses in the separator as a liquid. By disposing the water absorbing member in the portion to be brought into contact with the separator of the metal foam that is the oxidizer flow path forming member, the condensed water can be absorbed and trapped effectively.

Furthermore, because the water absorbing member is not in contact with the oxidizer electrode, the supply of air to the oxidizer electrode is not obstructed. Hence, the degradation of the output characteristics is suppressed.

Furthermore, the difference in the area of the surfaces exposed to the atmosphere may be provided by the difference in the area of a portion in which both ends of the water absorbing member protrude outside of (or extend beyond) the opening portion of the oxidizer flow path forming member (see Embodiment 1 described below). Thus, the area of the surface exposed to the atmosphere is increased, whereby the generated water absorbed by the water absorbing member can be guided out of the stack, and the area of the surface through which the generated water is discharged as vapor can be increased. This enables the generated water to be discharged effectively. Furthermore, the difference in area of the surfaces exposed to the atmosphere may be configured by the difference in area of a portion in which both ends of the water absorbing member are exposed to the atmosphere from the oxidizer flow path forming member in a portion in which both ends of the water absorbing member are in contact with the separator (see Embodiment 2 described below).

Specifically, for example, the depth at the ends of the groove formed in the metal foam may be made larger than that at the central portion of the groove. The ends of the groove formed in the oxidizer flow path forming member are formed to be deeper than the central portion thereof, whereby a step difference is formed in the groove. The ends are deeper than the central portion, and hence, the water absorbing member disposed in the groove is more exposed to the atmosphere by an amount corresponding to the step difference, whereby the area of the surface though which the generated water is discharged as vapor increases, and hence, the generated water can be discharged effectively.

Furthermore, the fuel cell unit located at the innermost portion, which constitutes the fuel cell stack, may be composed of a fuel cell unit having no water absorbing member.

Furthermore, the fuel cell unit located at the innermost portion, which constitutes the fuel cell stack, may be configured so that the water absorbing member is provided on an inner side of both side surfaces having the opening portion of the oxidizer flow path forming member.

By disposing both ends of the water absorbing member more to the inner side than the stack side surfaces, the water absorbing member is not exposed to the atmosphere. Hence, the water absorbing member functions as a water holding layer and is allowed to function advantageously in a high temperature state in which a dry-out proceeds.

Because of the above-mentioned configuration, there can be obtained a structure that can attend to flooding and dry-out caused by a temperature distribution in a stack direction under natural diffusion or a flow of a minimum amount of oxidizer.

Thus, a fuel cell stack can be realized in which both the flooding resistance of the fuel cell unit on the low-temperature side and the dry-out resistance of the fuel cell unit on the high-temperature side are achieved and using which the generation of electrical power may be performed stably with a high output.

Hereinafter, fuel cell stacks in accordance with various embodiments of the present invention in which a plurality of fuel cell units with the above-mentioned configuration are stacked are described in more detail.

In the fuel cell stack in each embodiment described below, an exemplary configuration in which 8 fuel cell units are stacked is illustrated. However, the present invention is not limited thereto.

Furthermore, the effects of the present invention may be expected as long as at least two kinds of fuel cell units constituting the fuel cell stack are used.

Embodiment 1

In Embodiment 1, an exemplary configuration in which a water absorbing member is provided as follows in a fuel cell stack in which eight fuel cell units illustrated in FIG. 1 are stacked is described.

More specifically, in this embodiment, water absorbing members having the largest area of the surface exposed to the atmosphere are provided in fuel cell units at both ends, a water absorbing member having an area smaller than that of the fuel cell units at both ends is provided in intermediate fuel cell units, and a water absorbing member is not provided on the innermost fuel cell units.

Figure 9:
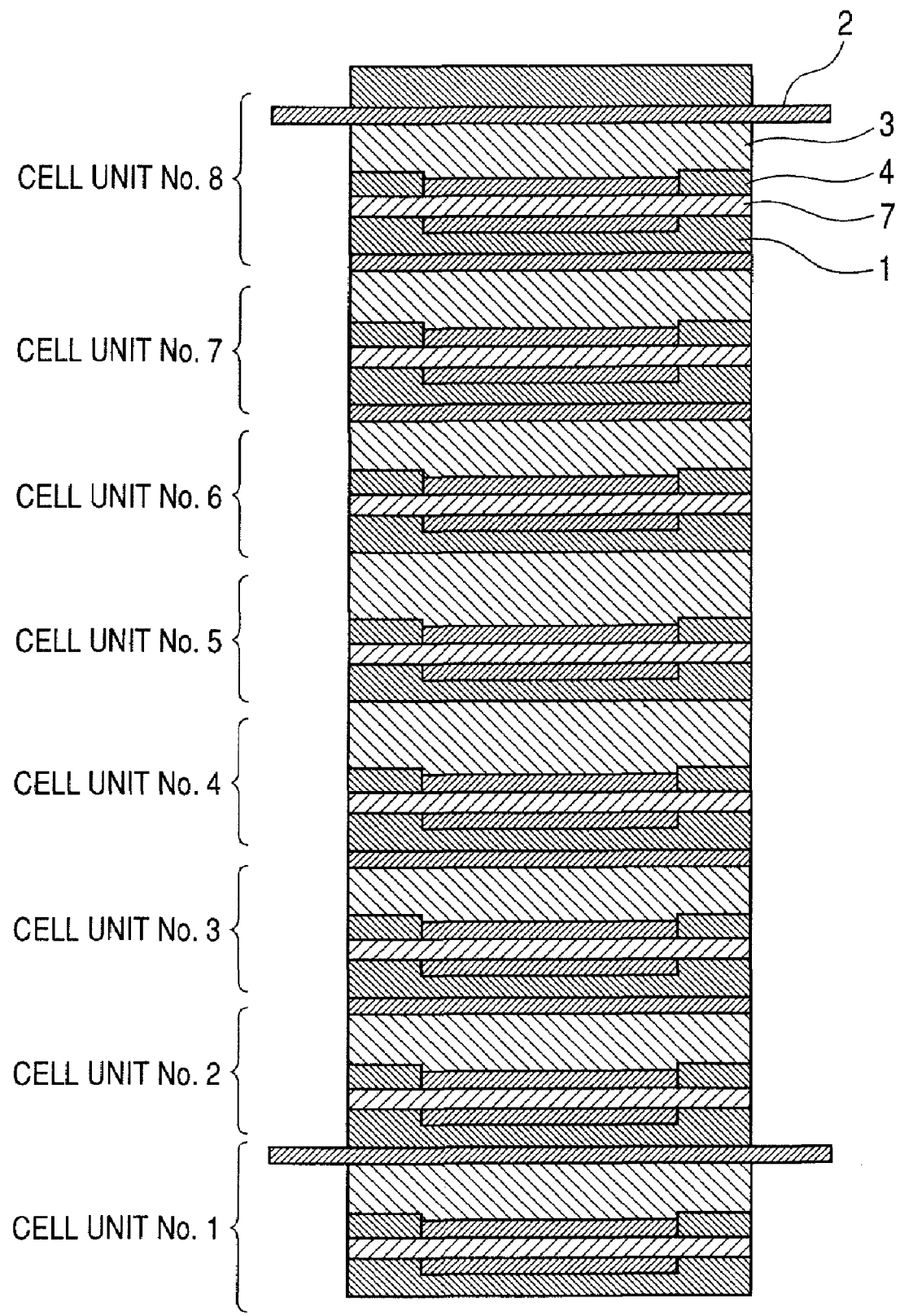
FIG. 9 is a schematic cross-sectional view illustrating the configuration of a fuel cell stack in accordance with Embodiment 1 of the present invention.

FIG. 9 illustrates the configuration of a fuel cell stack of this embodiment.

As illustrated in FIG. 9, the fuel cell stack according to this embodiment is configured in such a manner that eight fuel cell units, each illustrated in FIG. 1, are stacked in the order of fuel cell units Nos. 1, 2, 3, 4, 5, 6, 7, and 8 in the stack direction from the fuel electrode side.

Herein, in the fuel cell units Nos. 1 and 8, the temperatures of which become relatively lower at both ends, the water absorbing member 2 is disposed in the grooves of the oxidizer flow path forming member 3 provided with the grooves, as illustrated in FIG. 2.

Figure 5:
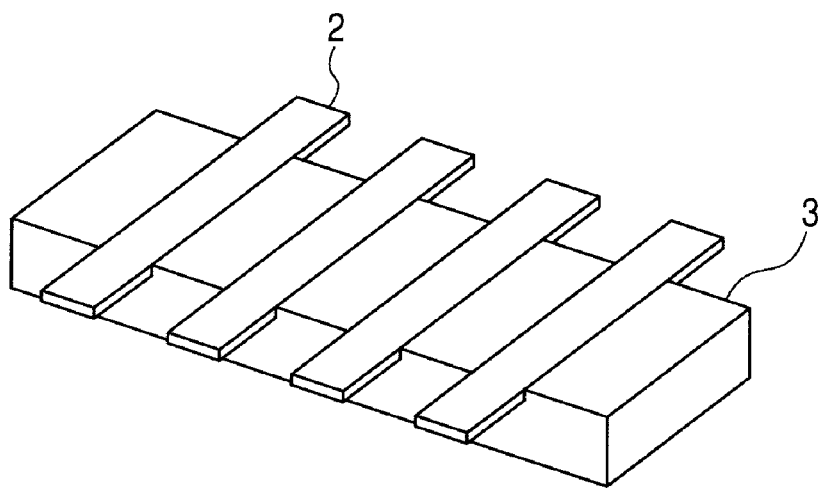
FIG. 5 is a schematic perspective view of an oxidizer flow path forming member and a water absorbing member in accordance with an embodiment of the present invention in which the water absorbing member is disposed on the oxidizer flow path forming member illustrated in FIG. 2 such that both ends of the water absorbing member extend outside of the side ends of the oxidizer flow path forming member.

At this time, the water absorbing member 2 is disposed such that both ends thereof protrude from (i.e., extend beyond) the open side surfaces of the oxidizer flow path forming member 3, as illustrated in FIG. 5.

Thus, the area of the surface of the water absorbing member 2 exposed to the atmosphere increases, whereby the absorbed generated water can be transpired and discharged efficiently.

In the fuel cell units Nos. 2, 3, 6, and 7, which reach intermediate temperatures, the water absorbing member 2 is disposed in the grooves of the oxidizer flow path forming member 3 illustrated in FIG. 2 such that both end surfaces thereof are flush with the open side surfaces of the oxidizer flow path forming member 3, respectively.

Consequently, there is less water transpired and discharged by the water absorbing member 2 than in the fuel cell units located at both ends.

Figure 3:
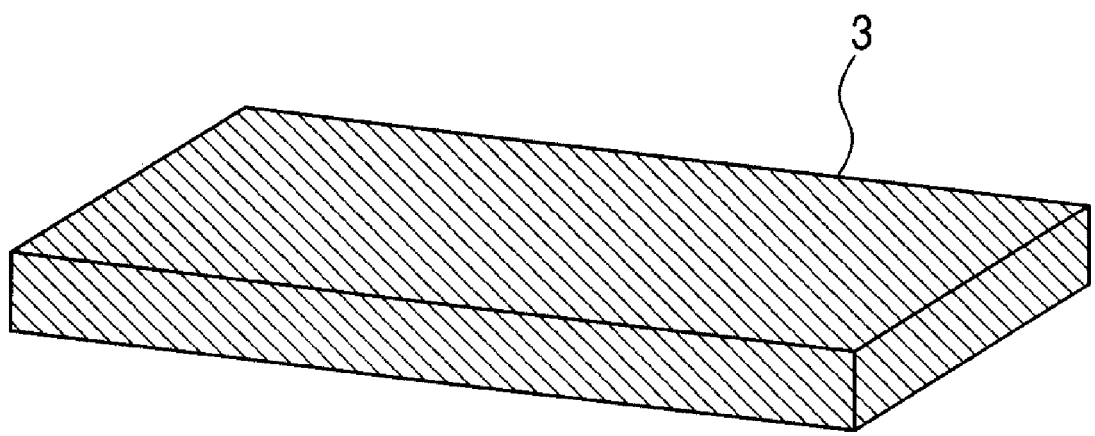
FIG. 3 is a schematic perspective view of an oxidizer flow path forming member having no groove used for a fuel cell unit in accordance with an embodiment of the present invention.

Furthermore, as the fuel cell units Nos. 4 and 5, the temperatures of which become relatively higher, fuel cell units, which use the oxidizer flow path forming member having no groove and on which the water absorbing member 2 is not disposed, as illustrated in FIG. 3, are used.

Thus, a fuel cell stack in which flooding resistance and dry-out resistance are satisfied can be obtained.

Embodiment 2

In Embodiment 2, an exemplary configuration in which a water absorbing member is provided as follows in a fuel cell stack in which eight fuel cell units illustrated in FIG. 1 are stacked is described.

In this embodiment, the configuration of a water absorbing member in fuel cell units at both ends is different from that in Embodiment 1.

More specifically, in this embodiment, in order to form a water absorbing member having the largest area of the surface exposed to the atmosphere, a water absorbing member is disposed in the grooves of the oxidizer flow path forming member an open side surface of which is partly cut off.

In the other intermediate fuel cell units and the fuel cell unit located at the innermost portion, the configuration of the water absorbing member is the same as that in Embodiment 1.

Figure 4:
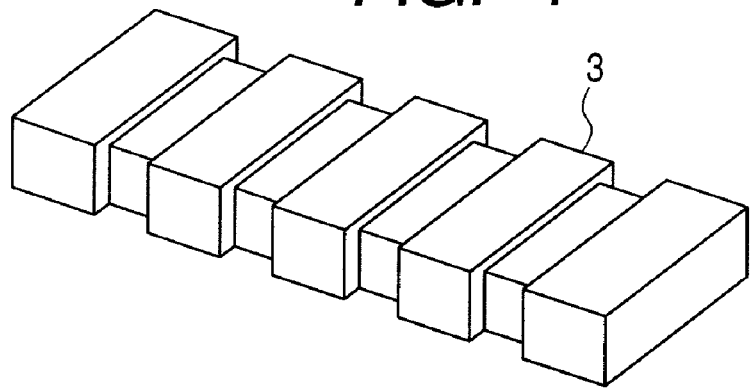
FIG. 4 is a schematic perspective view of an oxidizer flow path forming member in which grooves are formed on a side to be brought into contact with a separator and both ends of the grooves are cut off, which is used for a fuel cell unit in accordance with an embodiment of the present invention.
Figure 10:
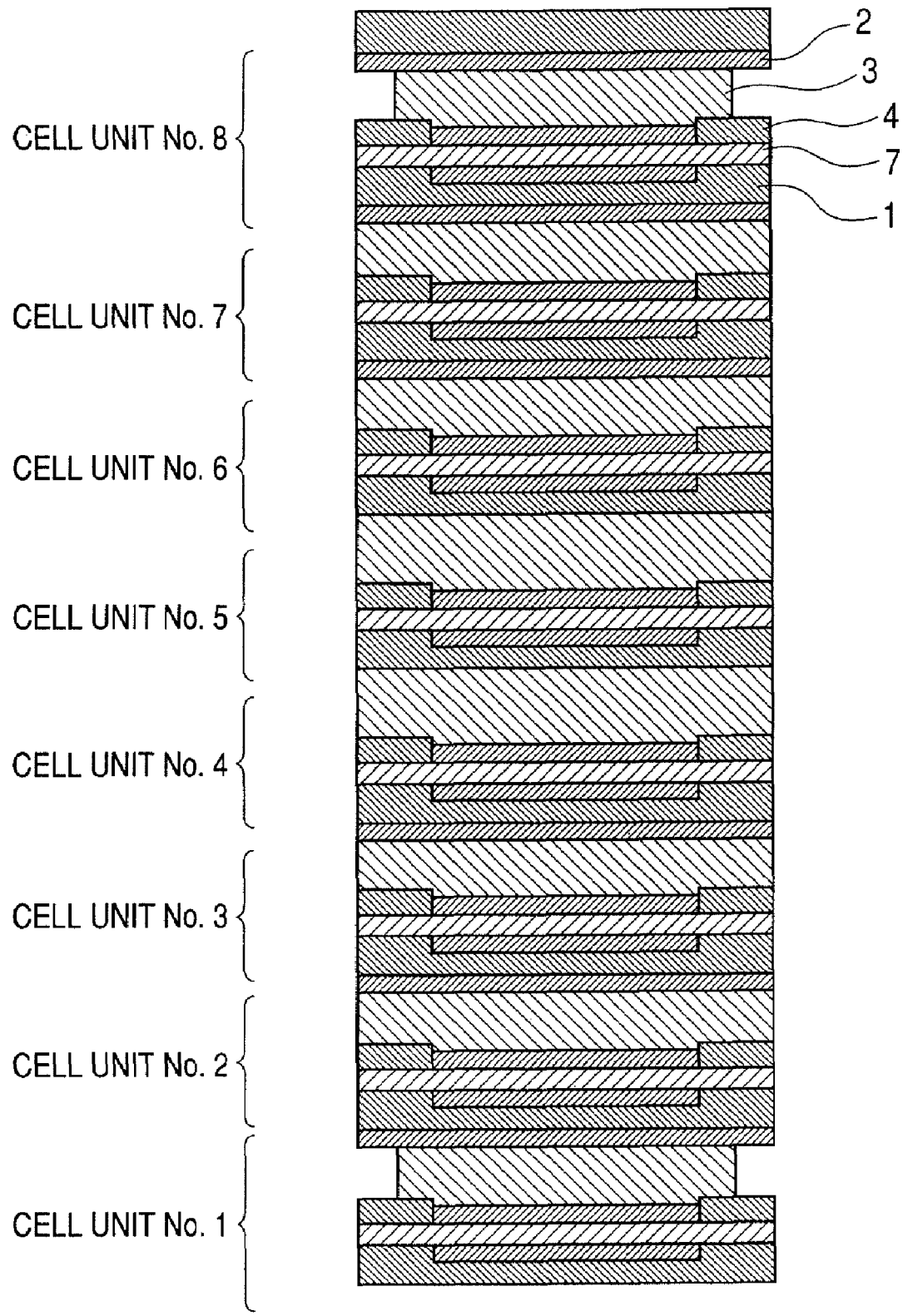
FIG. 10 is a schematic cross-sectional view illustrating the configuration of a fuel cell stack in accordance with Embodiment 2 of the present invention.

FIG. 10 illustrates the configuration of a fuel cell stack in accordance with this embodiment. As illustrated in FIG. 10, the fuel cell stack according to this embodiment is configured in such a manner that eight fuel cell units illustrated in FIG. 1 are stacked in the order of fuel cell units Nos. 1, 2, 3, 4, 5, 6, 7, and 8 in the stack direction from the fuel electrode side. In the fuel cell units Nos. 1 and 8, the temperatures of which become relatively lower at both ends of the stack, the water absorbing member 2 is disposed in the grooves of the oxidizer flow path forming member 3 provided with the grooves such as illustrated in FIG. 4. The open side surface of the portion having the grooves formed of the oxidizer flow path forming member 3 is cut off.

Figure 7:
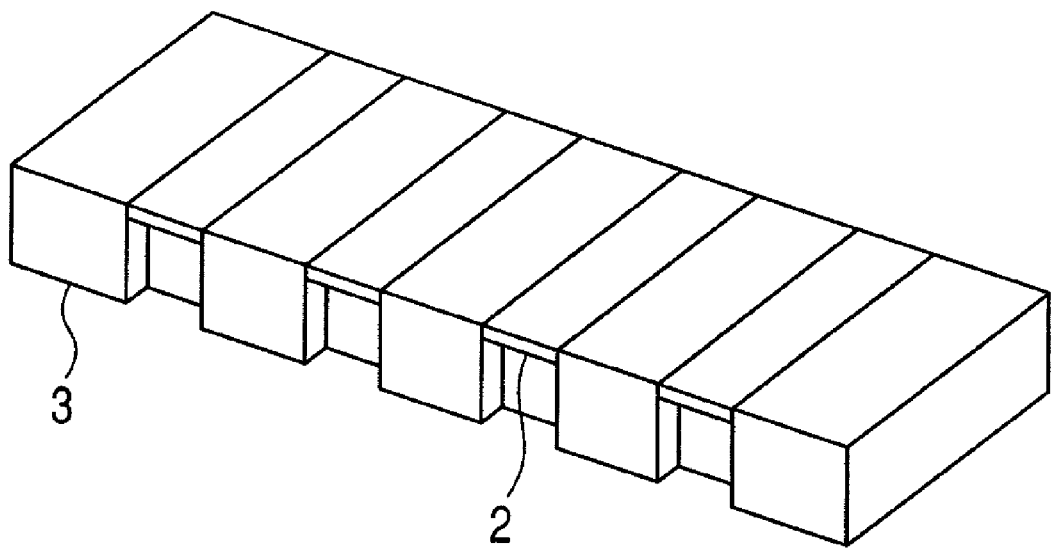
FIG. 7 is a schematic perspective view of an oxidizer flow path forming member and a water absorbing member in accordance with an embodiment of the present invention in which the water absorbing member is disposed on the oxidizer flow path forming member illustrated in FIG. 4 such that both end surfaces of the water absorbing member are flush with the side surfaces of the oxidizer flow path forming member, respectively.

In this state, as illustrated in FIG. 7, the water absorbing member 2 is disposed such that both end surfaces thereof are flush with the open side surface of the oxidizer flow path forming member 3, which is not cut off.

Thus, the water absorbing member disposed in the grove is exposed to the atmosphere in a portion in which the open side surface of the groove-formed portion of the oxidizer flow path forming member 3 is cut off.

Therefore, the area of the surface exposed to the atmosphere can be increased without necessarily extending the water absorbing member outside of the fuel cell unit, whereby a smaller fuel cell unit can be produced.

In the fuel cell units Nos. 2, 3, 6, and 7 which reach intermediate temperatures, the water absorbing member 2 is disposed in the grooves of the oxidizer flow path forming member 3 illustrated in FIG. 2 such that both end surfaces thereof are flush with the open side surface of the oxidizer flow path forming member 3.

Furthermore, as the fuel cell units Nos. 4 and 5, the temperatures of which become relatively higher, fuel cell units that use the oxidizer flow path forming member having no groove and on which the water absorbing member 2 is not disposed, such as illustrated in FIG. 3, are used.

Thus, a fuel cell stack, which strikes a balance between satisfactory flooding and dry-out resistances can be realized.

Embodiment 3

In Embodiment 3, an exemplary configuration in which a water absorbing member is provided as follows in a fuel cell stack in which eight fuel cell units illustrated in FIG. 1 are stacked is described.

In this embodiment, the configuration of the water absorbing member in the fuel cell unit at the innermost portion is different from that in Embodiment 1.

More specifically, in this embodiment, the water absorbing member is provided in the fuel cell unit at the innermost portion of the stack such that both ends of the water absorbing member are positioned at the inner side of the open side surfaces of the oxidizer flow path forming member.

The configurations of the water absorbing members in the fuel cell units at both ends and the intermediate fuel cell units are the same as those in Embodiment 1.

Figure 8:
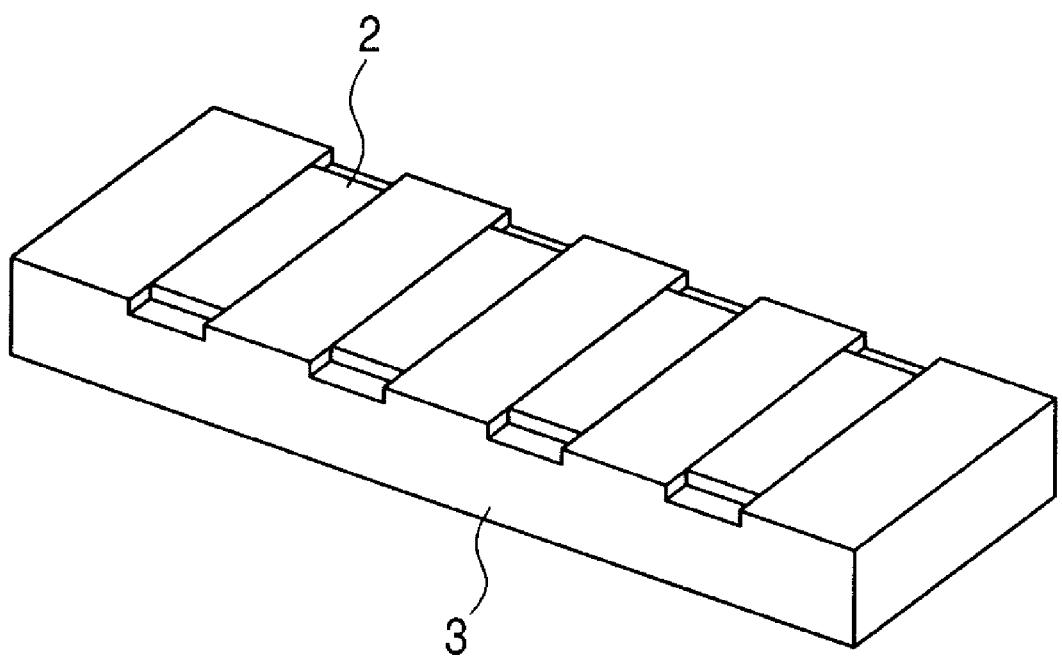
FIG. 8 is a schematic perspective view of an oxidizer flow path forming member and a water absorbing member in accordance with an embodiment of the present invention in which the water absorbing member is disposed on the oxidizer flow path forming member illustrated in FIG. 2 such that both ends of the water absorbing member are positioned inside of the side surfaces of the oxidizer flow path forming member, respectively.
Figure 11:
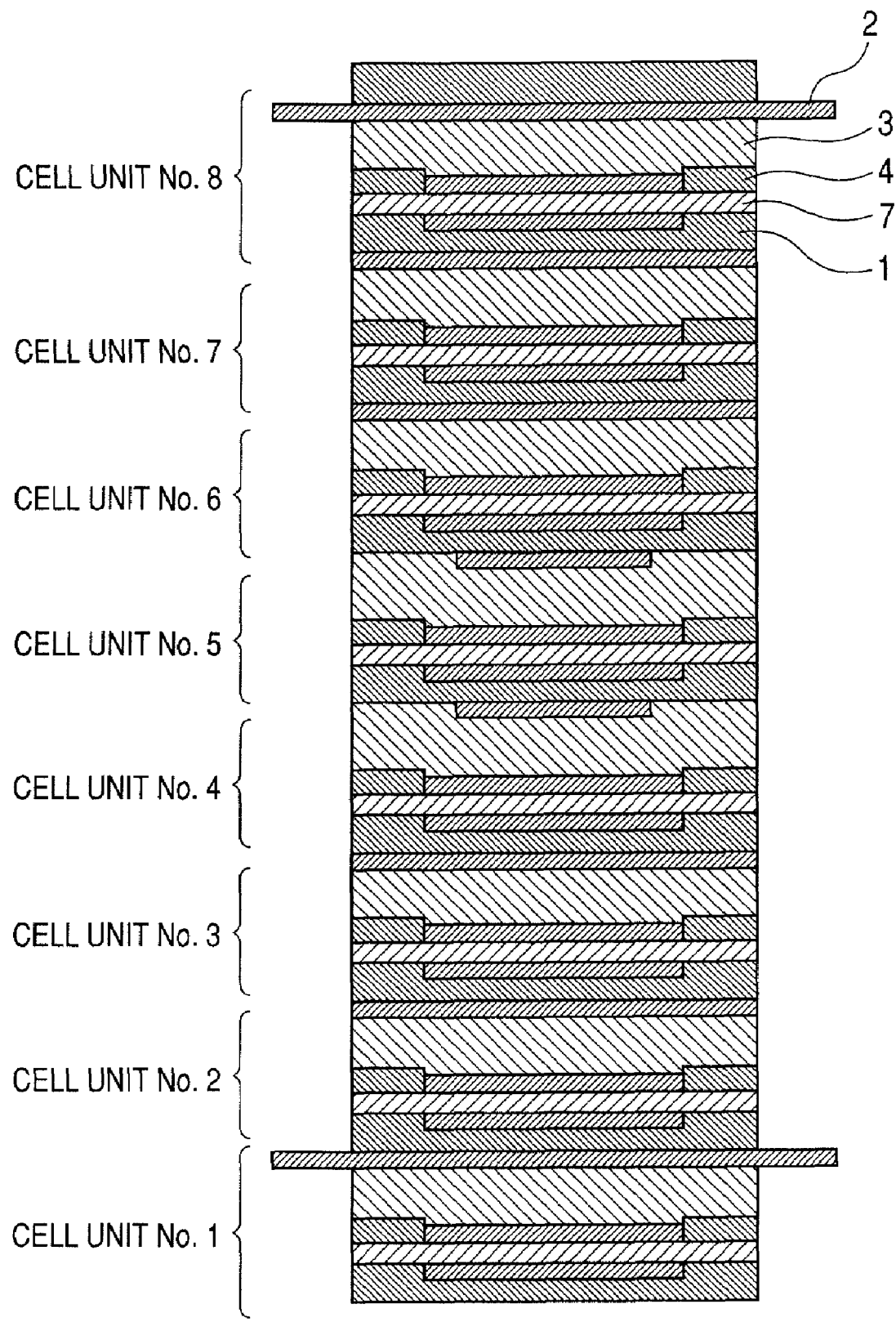
FIG. 11 is a schematic cross-sectional view illustrating the configuration of a fuel cell stack in accordance with Embodiment 3 of the present invention.

FIG. 11 illustrates the configuration of a fuel cell stack in this embodiment. As illustrated in FIG. 11, the fuel cell stack according to this embodiment is configured in such a manner that eight fuel cell units illustrated in FIG. 1 are stacked in the order of fuel cell units Nos. 1, 2, 3, 4, 5, 6, 7, and 8 in the stack direction from the fuel electrode side. Furthermore, in this embodiment, in the fuel cell units Nos. 4 and 5, which reach relatively higher temperatures, the water absorbing member 2 is disposed as illustrated in FIG. 8 such that both ends thereof are positioned at the inner side of both side surfaces of the oxidizer flow path forming member 3 illustrated in FIG. 2. The water absorbing member 2 is disposed without being exposed to the atmosphere, and hence, the transpiration ability thereof can be suppressed, whereby the water absorbing member 2 can be used as a humectant material, and the characteristics at high temperatures can be improved.

Thus, a fuel cell stack in which the characteristics at high temperatures are improved, and both the flooding resistance and dry out resistance are satisfied, can be realized.

Embodiment 4

In Embodiment 4, an exemplary configuration in which a water absorbing member is provided as follows in a fuel cell stack in which eight fuel cell units illustrated in FIG. 1 are stacked is described.

In this embodiment, the configurations of the water absorbing member in the fuel cell unit the temperature of which becomes relatively higher on the inner side of the stack and the fuel cell unit the temperature of which becomes the highest at the innermost portion of the stack are different from those in Embodiment 1.

More specifically, in this embodiment, the water absorbing member 2 is not disposed in the fuel cell unit the temperature of which becomes relatively higher on the inner side of the stack, and the water absorbing member is disposed such that both ends thereof are positioned at the inner side of the open side surfaces of the oxidizer flow path forming member in the fuel cell unit the temperature of which becomes the highest at the innermost portion of the stack.

Figure 12:
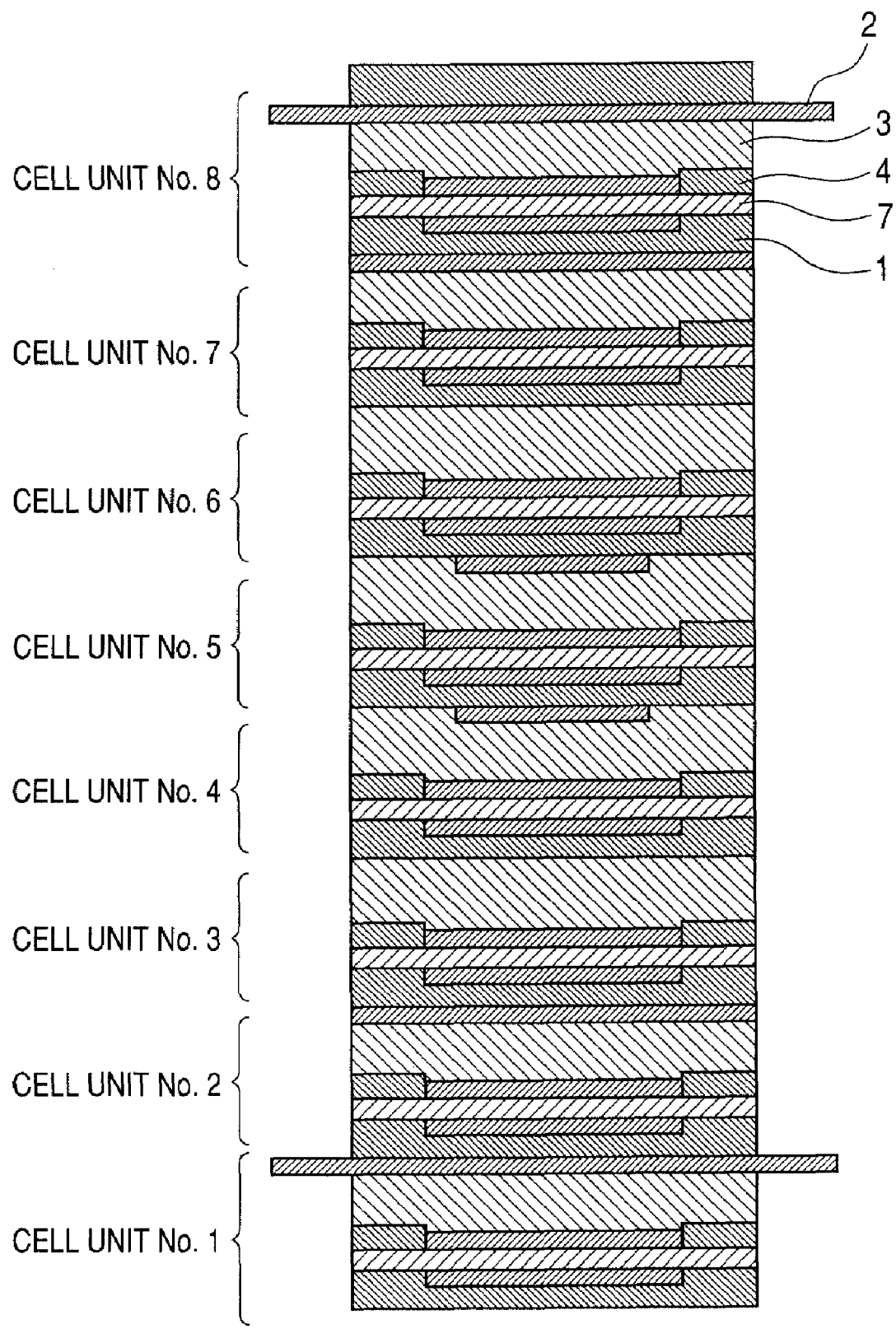
FIG. 12 is a schematic cross-sectional view illustrating the configuration of a fuel cell stack in accordance with Embodiment 4 of the present invention.

FIG. 12 illustrates the configuration of a fuel cell stack in this embodiment. As illustrated in FIG. 12, the fuel cell stack according to this embodiment is configured in such a manner that eight fuel cell units illustrated in FIG. 1 are stacked in the order of fuel cell units Nos. 1, 2, 3, 4, 5, 6, 7, and 8 in the stack direction from the fuel electrode side. Herein, in the fuel cell units Nos. 1 and 8, the temperatures of which become relatively lower at both ends, the water absorbing member 2 is disposed in the grooves of the oxidizer flow path forming member 3 provided with the grooves as illustrated in FIG. 2.

In this state, the water absorbing member 2 is disposed such that both ends thereof protrude from (i.e., extend beyond) the open side surfaces of the oxidizer flow path forming member 3, respectively, as illustrated in FIG. 5.

Thus, the area of the surface of the water absorbing member 2 exposed to the atmosphere increases, whereby the absorbed generated water can be transpired and discharged efficiently.

Figure 6:
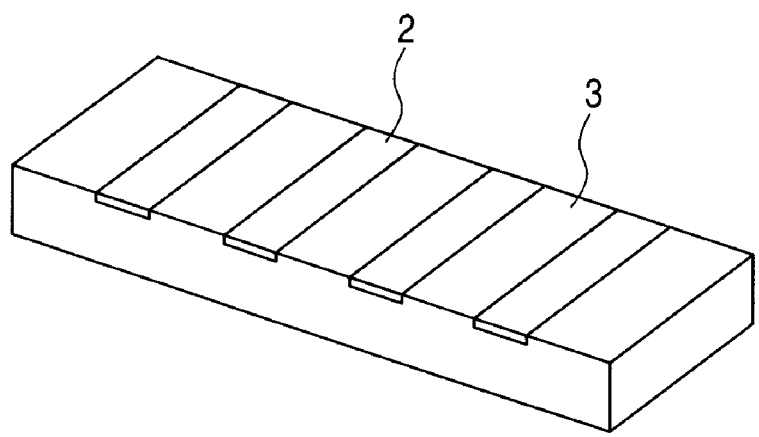
FIG. 6 is a schematic perspective view of an oxidizer flow path forming member and a water absorbing member in accordance with an embodiment of the present invention in which the water absorbing member is disposed on the oxidizer flow path forming member illustrated in FIG. 2 such that both end surfaces of the water absorbing member are flush with the side surfaces of the oxidizer flow path forming member, respectively.

In the fuel cell units Nos. 2 and 7, which reach intermediate temperatures, as illustrated in FIG. 6, the water absorbing member 2 is disposed in the grooves of the oxidizer flow path forming member 3 illustrated in FIG. 2 such that both end surfaces thereof are flush with both side surfaces of the oxidizer flow path forming member 3, respectively.

Furthermore, as the fuel cell units Nos. 3 and 6 the temperatures of which become relatively higher, fuel cell units that use the oxidizer flow path forming member having no groove and on which the water absorbing member 2 is not disposed, such as illustrated in FIG. 3, are used.

Furthermore, in the fuel cell units Nos. 4 and 5, the temperatures of which become the highest, as illustrated in FIG. 8, the water absorbing member 2 is disposed in the grooves of the oxidizer flow path forming member 3 illustrated in FIG. 2 such that both ends thereof are positioned at the inner side of the open side surfaces of the oxidizer flow path forming member 3, respectively.

The water absorbing member is disposed without being exposed to the atmosphere, and hence, the transpiration ability thereof can be suppressed, whereby the water absorbing member can be used as a humectant material, and the characteristics at high temperatures can be improved. Thus, a fuel cell stack can be realized in which the characteristics at high temperatures are improved, and both the flooding resistance and dry-out resistance are satisfied.

Embodiment 5

In Embodiment 5, an exemplary configuration in which a water absorbing member is provided as follows in a fuel cell stack in which eight fuel cell units illustrated in FIG. 1 are stacked is described.

In this embodiment, the configurations of the water absorbing members in the fuel cell units the temperatures of which become relatively lower at both ends of the stack are different from those in Embodiment 1.

Figure 13:
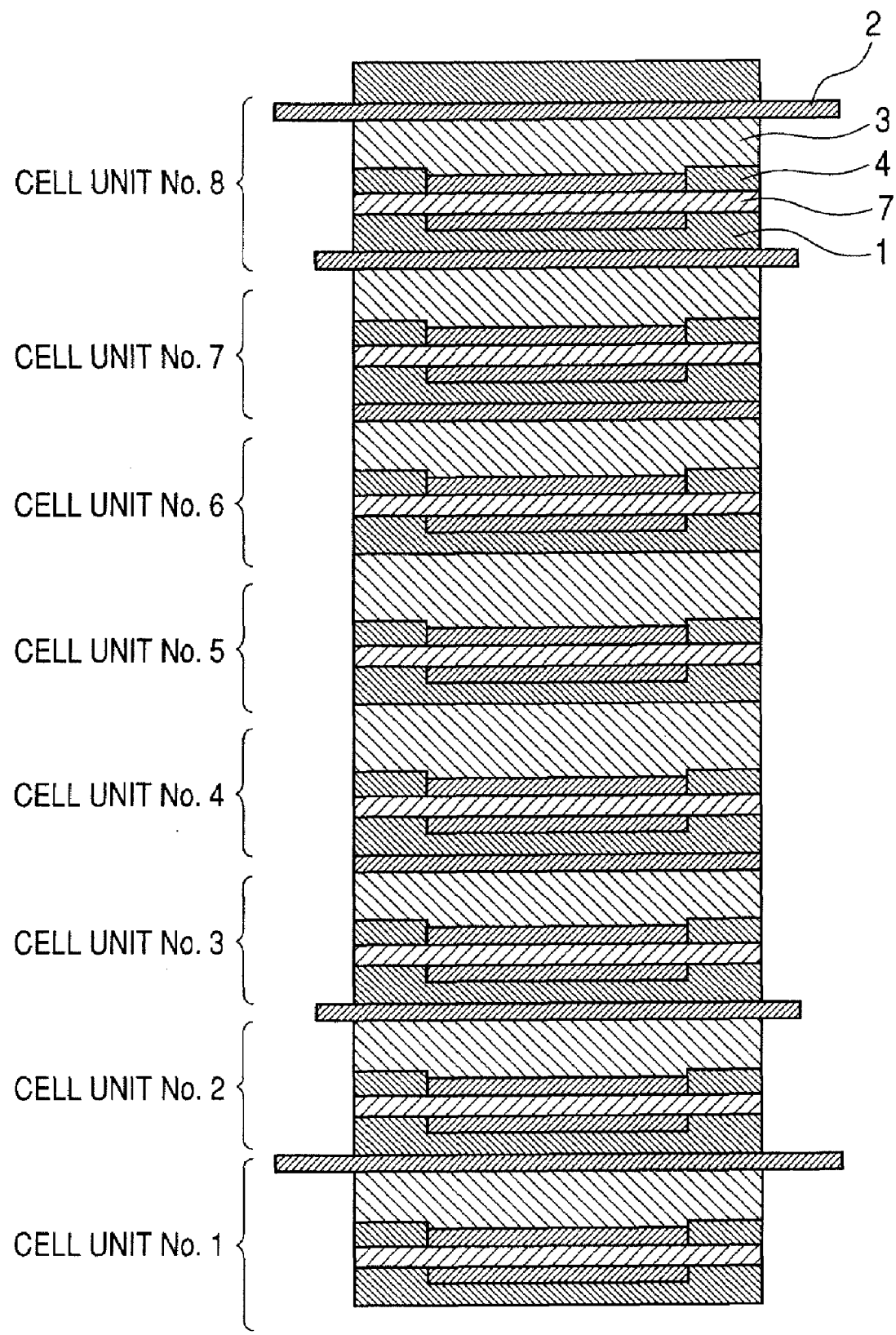
FIG. 13 is a schematic cross-sectional view illustrating the configuration of a fuel cell stack in accordance with Embodiment 5 of the present invention.

FIG. 13 illustrates the configuration of a fuel cell stack in this embodiment. As illustrated in FIG. 13, the fuel cell stack according to this embodiment is configured in such a manner that eight fuel cell units illustrated in FIG. 1 are stacked in the order of fuel cell units Nos. 1, 2, 3, 4, 5, 6, 7, and 8 in the stack direction from the fuel electrode side. In the embodiment, in the fuel cell units Nos. 1, 2, 7, and 8, the temperatures of which become relatively lower at both end portions, the water absorbing members 2 are disposed in the grooves of the oxidizer flow path forming member 3 provided with the grooves, as illustrated in FIG. 2. In this state, as illustrated in FIG. 5, the water absorbing member 2 is disposed such that both ends thereof protrude from the open side surfaces of the oxidizer flow path forming member 3, respectively.

Thus, the area of the surface of the water absorbing member exposed to the atmosphere can be increased, whereby the absorbed generated water can be transpired and discharged efficiently.

Herein, the temperatures of the fuel cell units Nos. 1 and 8, which are located at both ends of the stack, become lower than those of the fuel cell units Nos. 2 and 7 located at the inner side of the units Nos. 1 and 8, and hence, the enlarged surface areas of the water absorbing members 2 in the fuel cell units Nos. 1 and 8 are set to be larger than those in the fuel cell units Nos. 2 and 7.

In the fuel cell units Nos. 3 and 6, which reach intermediate temperatures, as illustrated in FIG. 6, the water absorbing members 2 are disposed in the grooves of the oxidizer flow path forming member 3 illustrated in FIG. 2 such that both end surfaces thereof are flush with the open side surfaces of the oxidizer flow path forming member 3, respectively.

Furthermore, in the fuel cell units Nos. 4 and 5, the temperatures of which become relatively higher, fuel cell units that use the oxidizer flow path forming member having no groove and on which the water absorbing member 2 is not disposed, such as illustrated in FIG. 3, are used.

Thus, a fuel cell stack in which both the flooding resistance and dry-out resistance are satisfied can be obtained.

Embodiment 6

A fuel cell stack of Embodiment 6 is obtained by stacking eight fuel cell units illustrated in FIG. 1 to form a stack cell.

In the case where fuel cell units are stacked with Nos. 1, 2, 3, 4, 5, 6, 7, and 8 denoted in the stack direction from the fuel electrode side and allowed to generate electrical power, the generated water discharged from the fuel cell units in the lower layers rises as water vapor, thereby increasing the humidity at the periphery of the fuel cell unit in the upper layer.

For example, in the case where a stack is formed with the fuel cell unit No. 1 being disposed on a lower side, the water generated in each fuel cell unit becomes water vapor and rises up against the gravity.

Consequently, the periphery of the fuel cell unit No. 8 in the uppermost portion in the gravity direction will have a high humidity.

In the high-humidity atmosphere, the transpiration ability of water absorbing fibers decreases, and hence, the discharge ability of the fuel cell unit in the upper layer decreases.

According to this embodiment, in order to enhance the discharge ability of the fuel cell unit in the upper layer, the transpiration ability of the water absorbing fibers is enhanced even in a high-humidity atmosphere.

Specifically, a portion of the water absorbing fibers disposed in the fuel cell unit in the upper portion in the gravity direction, which is extended outside of the fuel cell unit, is brought into contact with a stack constituting member the temperature of which becomes higher than the outside temperature.

The stack has a high temperature when electrical power is generated. Hence, the temperatures of the current collector and the end plate become 40° C. or higher.

The member the temperature of which becomes high is brought into contact with the water absorbing fibers so as to give heat thereto, whereby the evaporation and discharge may be accelerated even in the high humidity atmosphere.

Figure 14:
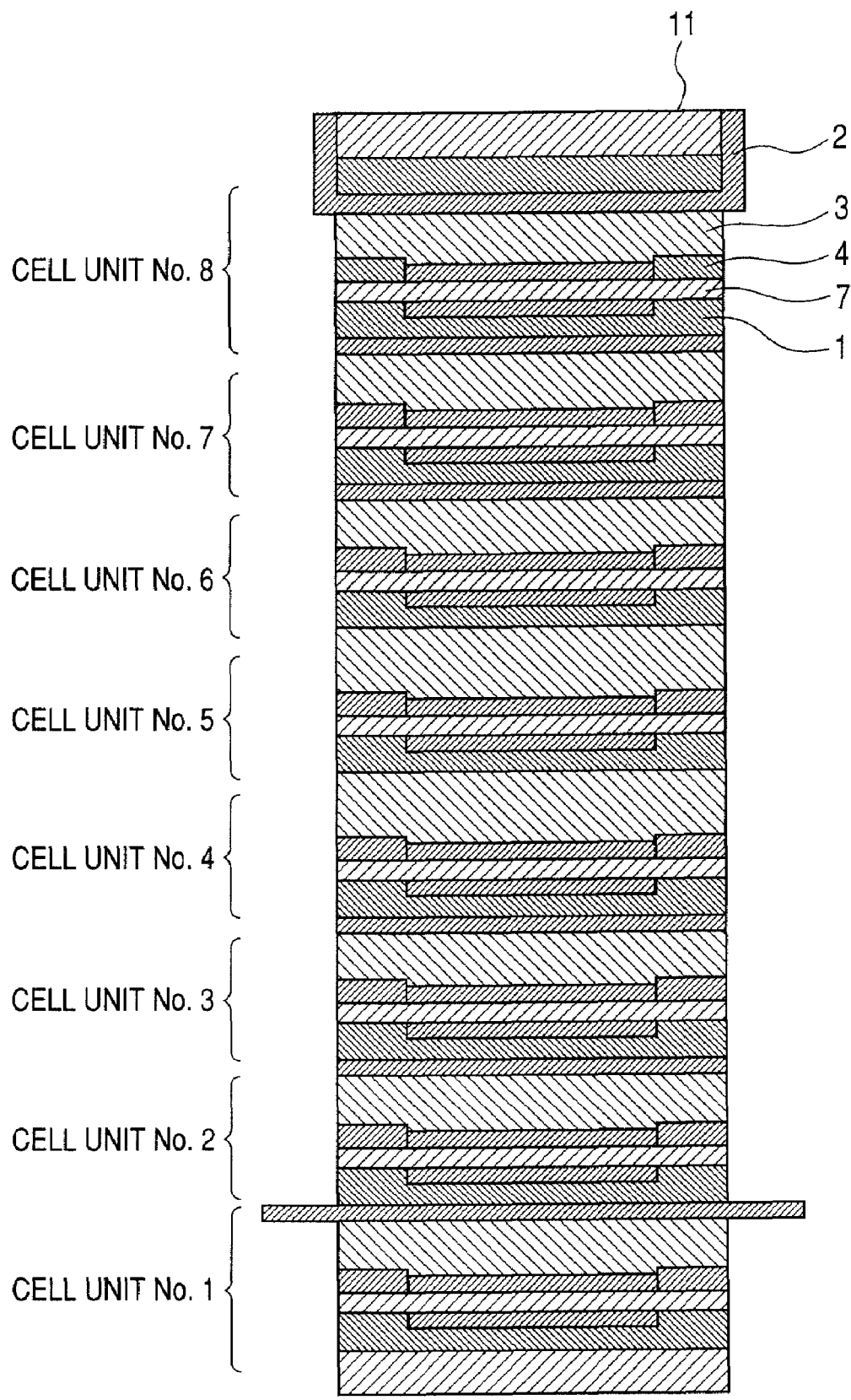
FIG. 14 is a schematic cross-sectional view of a fuel cell stack illustrated in accordance with Embodiment 6 of the present invention.

FIG. 14 is a schematic cross-sectional view of a fuel cell stack in accordance with this embodiment.

In the schematic cross-sectional view of FIG. 14, the water absorbing fibers extending outside of the uppermost fuel cell unit of the fuel cell stack in Embodiment 1 illustrated in FIG. 9 are brought into contact with the current collector and the end plate that are stack members the temperatures of which become higher than the outside temperature.

As long as the uppermost fuel cell unit is configured as illustrated in FIG. 14, the structures of the other fuel cell units may be as illustrated in Embodiments 2 to 5.

EXAMPLES

Hereinafter, the present invention is described by way of examples.

Example 1

First, the production of a membrane electrode assembly in this example is described.

A platinum oxide catalyst having a dendritic structure was formed in a thickness of 2000 nm on a polytetrafluoroethylene (PTFE) sheet (Nitfron (trade name); manufactured by Nitto Denko Corporation) that was used as a layer for the transfer to an electrolyte membrane by a reactive sputtering process.

The Pt carrying amount at this time was measured by XRF and found to be 0.68 mg/cm². The reactive sputtering process was performed under the conditions of a total pressure of 4 Pa, an oxygen flow rate ($Q_{o2}/Q_{Ar}+Q_{o2}$)) of 70%, a substrate temperature of 300° C., and an input power of 4.9 W/cm².

Subsequently, the platinum oxide catalyst with the dendrite structure was subjected to a reduction at 120° C. for 30 minutes in a 2% $H_2$/He atmosphere (1 atm), whereby a platinum catalyst layer with the dendrite structure was formed on the PTFE sheet. Furthermore, the PTFE sheet was impregnated with a mixed suspension solution of PTFE and Nafion (trade name) to form an electrolyte channel on the surface of the catalyst effectively, followed by an appropriate water-repellent treatment, whereby a catalyst layer on the oxidizer electrode side was obtained.

Next, a platinum oxide catalyst having a dendritic structure was formed in a thickness of 500 nm on a PTFE sheet (Nitfron (trade name); manufactured by Nitto Denko Corporation) that was used as a layer for the transfer to an electrolyte membrane by a reactive sputtering process.

The Pt carrying amount was measured by XRF and found to be 0.17 mg/cm$^2$. The reactive sputtering process was performed under the conditions of a total pressure of 4 Pa, an oxygen flow rate ($Q_{O2}/Q_{Ar}+Q_{O2}$)) of 70%, a substrate temperature of 300° C., and a power of 4.9 W/cm$^2$.

Subsequently, the platinum oxide catalyst with the dendritic structure was subjected to a reduction at 120° C. for 30 minutes in a 2% $H_2$/He atmosphere (1 atm), whereby a platinum catalyst layer with the dendritic structure was obtained on the PTFE sheet. Furthermore, the PTFE sheet was impregnated with a suspension solution of Nafion (trade name) to form an electrolyte channel on the surface of the catalyst effectively, whereby a catalyst layer on the fuel electrode side was obtained.

Next, a polymer electrolyte membrane (Nafion 112 (trade name); manufactured by Dupont Corporation) was sandwiched by the catalyst layer on the oxidizer electrode side and the catalyst layer on the fuel electrode side produced in the above-mentioned steps, and the resulting structure was hot pressed under the pressing conditions of 150° C. and 8 MPa for one minute.

After that, the PTFE sheet was peeled to transfer the pair of catalyst layers to the polymer electrolyte membrane, whereby a membrane electrode assembly 7 in which an electrolyte membrane was bonded to a pair of catalyst layers was obtained.

Next, an exemplary configuration of the stack of this example is described.

The exemplary configuration of the fuel cell stack of this example is described for the case where the fuel cell stack of Embodiment 1 is produced using typical materials and numerical values.

The exemplary configuration is obtained in such a manner that eight fuel cell units illustrated in FIG. 1 are stacked, and the fuel cell units are referred to as the fuel cell units Nos. 1, 2, 3, 4, 5, 6, 7, and 8 from the fuel electrode side.

Herein, the width of the fuel cell is about 10 mm and the length thereof is about 30 mm.

A separator 1 was obtained by plating a stainless steel sheet surface having a thickness of about 0.5 mm with gold.

In the separator 1, a portion corresponding to the fuel electrode was cut to a depth of about 0.2 mm to form a fuel electrode chamber 10. Carbon cloth was disposed as the fuel electrode side gas diffusion layer 9 in the fuel electrode chamber 10.

As the carbon cloth, LT2500W (trade name) manufactured by E-TEK was used, and the thickness thereof before the clamping is set to be about 0.4 mm, the carbon cloth being compressed to about 0.3 mm at the time of the clamping.

Thus, the carbon cloth can decrease the contact resistance between the membrane electrode assembly 7 and the separator 1 to maintain the current colleting property while being contained in the fuel electrode chamber 10 at the time of clamping.

The sealing member 8 was disposed at an outer peripheral edge of the separator 1. A sealed space is formed between the membrane electrode assembly 7 and the separator 1 at the time of clamping so as to prevent the leakage of hydrogen from the fuel electrode chamber 10.

As the sealing member 8, a sealing member manufactured by Viton (trade name; manufactured by DuPont Corporation) with a thickness of 0.1 mm and a width of 1 mm was used.

On the oxidizer electrode side, carbon cloth (LT1200W (trade name); manufactured by E-TEK) with a thickness of about 0.3 mm was disposed as the oxidizer electrode side gas diffusion layer 5, and a metal foam was disposed as the oxidizer flow path forming member 3.

In the fuel cell units Nos. 4 and 5 the temperatures of which become the highest during the generation of electrical power, carbon cloth (LT2500W (trade name); manufactured by E-TEK) with a thickness of about 0.4 mm and excellent water retention ability was used.

A highly rigid material containing nickel and chromium as main components, having a pore size of about 900 μm and a porosity of about 90%, was used as the metal foam. Furthermore, the thickness of the material was set to be about 1.5 mm.

Four grooves with a width of 2.5 mm and a depth of 0.45 mm, such as illustrated in FIG. 2, were previously formed on the side of the metal foam that is to be brought into contact with the separator 1 so as to traverse the air inflow direction. A liquid diffusion nonwoven fabric P type, manufactured by AMBIC Co., Ltd., cut to a width of 2.5 mm, was disposed in the grooves as a water absorbing member made of polyimide fibers.

At this time, in the fuel cell units Nos. 1 and 8 located at both ends of the stack, the temperatures of which become relatively lower, four water absorbing members each cut to a length of 14 mm were disposed such that both ends thereof extended outside by 2 mm, respectively, such as illustrated in FIG. 5.

Furthermore, in the fuel cell units Nos. 2, 3, 6, and 7, which reach intermediate temperatures, four water absorbing members each cut to a length of 10 mm were disposed without being extended outside such that both end surfaces thereof were flush with the side surfaces of the fuel cell units, respectively.

Next, an evaluation method is described.

The three kinds of fuel cell units Nos. 1, 2, and 4 described in the stack configurations were evaluated, respectively.

A heater was introduced into each fuel cell unit to keep the temperature at 40° C. to 65° C., and a constant current measurement at a current density of 400 mA/cm$^2$ was conducted by natural inflow without using a flow by a blower in a windless atmosphere at a temperature of 25° C. and a relative humidity of 50%.

Furthermore, the three kinds of fuel cell units were stacked in the arrangement described in the stack configuration to produce a fuel cell stack, and a constant current measurement at a current density of 400 mA/cm$^2$ was conducted by natural inflow without using a flow by a blower in a windless atmosphere at a temperature of 25° C. and a relative humidity of 50%.

Comparative Example

As a comparative example for comparison with the fuel cell stack in accordance with Example 1 of the present invention, the fuel cell unit not provided with the liquid diffusion nonwoven fabric P type (manufactured by AMBIC Co., Ltd.) was evaluated in the same manner as in the above-mentioned evaluation method using the same membrane electrode assembly in the cell configuration used in the fuel cell of Example 1.

Herein, as the gas diffusion layer on the oxidizer electrode side, carbon cloth (LT1200W (trade name); manufactured by E-TEK), which is different from that used in Example 1, was used.

Thus, the difference in the characteristics depending upon the presence/absence of the liquid diffusion nonwoven fabric P type (manufactured by AMBIC Co., Ltd.) and upon the kind of the oxidizer electrode diffusion layer were compared.

Figure 15:
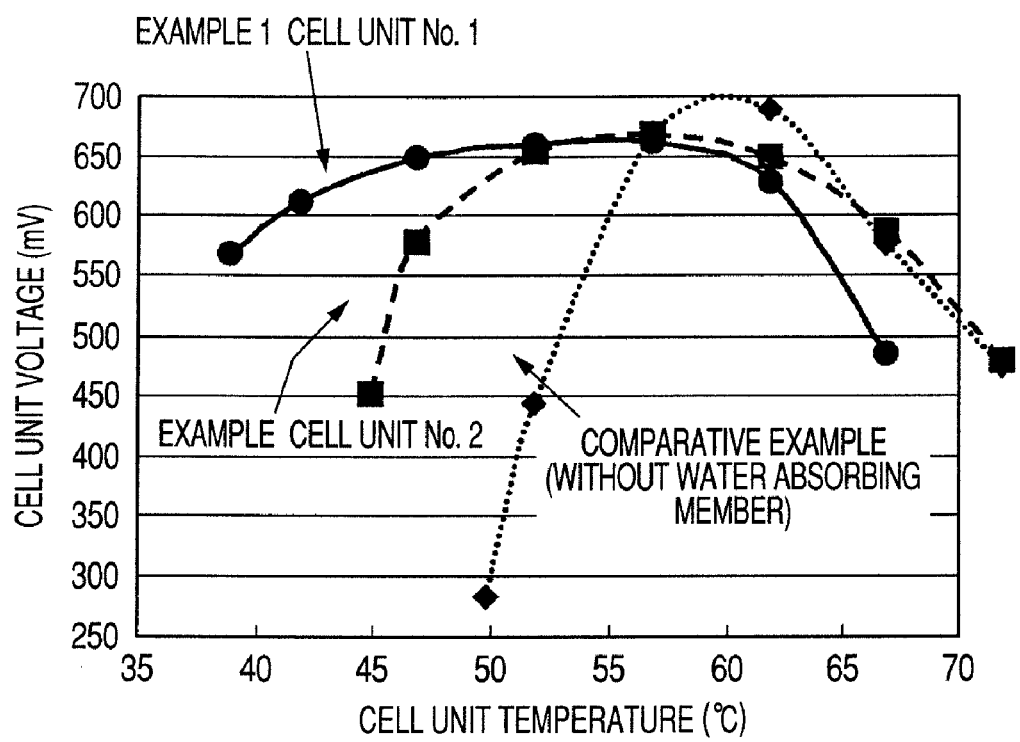
FIG. 15 is a graphical representation illustrating a relationship between a cell unit temperature and a cell unit voltage of the cell units in accordance with Example and Comparative Example.

FIG. 15 illustrates unit cell voltages of the respective cell unit configurations at various temperatures.

Incidentally, the cell unit voltage is a voltage measured after a constant current operation at 400 mA/cm$^2$ for 4.5 hours.

As illustrated in FIG. 15, the voltage of the fuel cell unit No. 1 is high at low temperatures and is low at high temperatures.

In contrast, the voltage of the fuel cell unit of the comparative example is low at low temperatures and higher at high temperature. Of the difference in the characteristics, the difference in the characteristics on the low temperature side is considered to be attributable to flooding that occurred due to retention of generated water.

Therefore, when the weight of the resident water in each fuel cell unit was measured, the results were such that the resident amount of generated water in the fuel cell unit No. 1 after 4.5 hours at 40° C. was 108 mg, and the resident amount of generated water in the fuel cell unit No. 2 after 4.5 hours at 40° C. was 138 mg.

In contrast, the resident amount of generated water was 180 mg in the fuel cell unit of the comparative example.

The reason for this is that the larger is the area of the surface of the liquid diffusion nonwoven fabric P type (manufactured by AMBIC Co., Ltd.) exposed to the outside of the fuel cell unit, the greater is its ability to transpire the generated water, whereby the ability to discharge the generated water is improved, which suppresses flooding.

Furthermore, on the high temperature side on which the generated water is more susceptible to transpiration and dryout, the cell unit in which the area of the surface of the liquid diffusion nonwoven fabric P type (manufactured by AMBIC Co., Ltd.) exposed to the outside of the cell unit is small, or the fuel cell unit in which liquid diffusion nonwoven fabric P type (manufactured by AMBIC Co., Ltd.) is not disposed, exhibits satisfactory characteristics because of the good ability to retain generated water.

Figure 16:
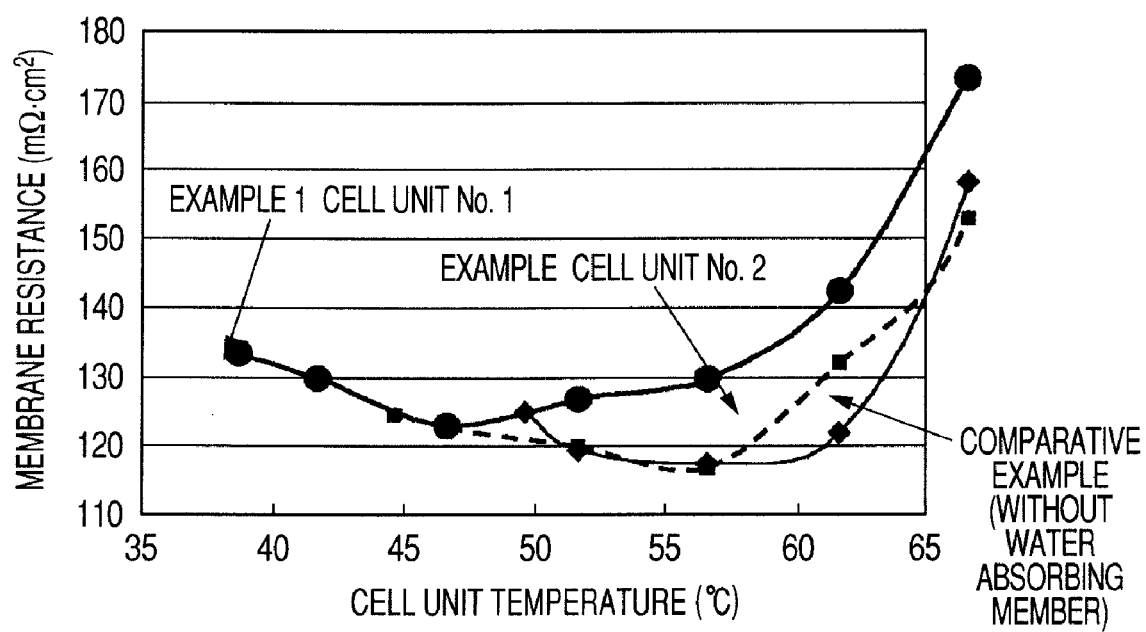
FIG. 16 is a graphical representation illustrating a relationship between a cell unit temperature and an electrolyte membrane resistance of fuel cell units in accordance with Example 1 and the Comparative Example.

FIG. 16 illustrates an electrolyte membrane resistance at each temperature.

Generally, when humidification is sufficient, the resistance of an electrolyte membrane decreases as the temperature increases. Therefore, in any cell unit configuration, the membrane resistance decreases along with the increase in temperature on the relatively lower temperature side. However, membrane resistance starts to increase at a certain temperature. This means that the membrane becomes dry because the temperature increases to decrease the relative humidity.

The point at which the membrane resistance starts increasing is shifted to the lower temperature side as the area of the surface of the liquid diffusion nonwoven fabric P type (manufactured by AMBIC Co., Ltd.) exposed to the outside of the fuel cell unit is larger.

This means that when the cell unit temperature increases, the water discharge ability becomes too high, which has an adverse effect on the water retention ability to thereby degrade the fuel cell characteristics.

Figure 17:
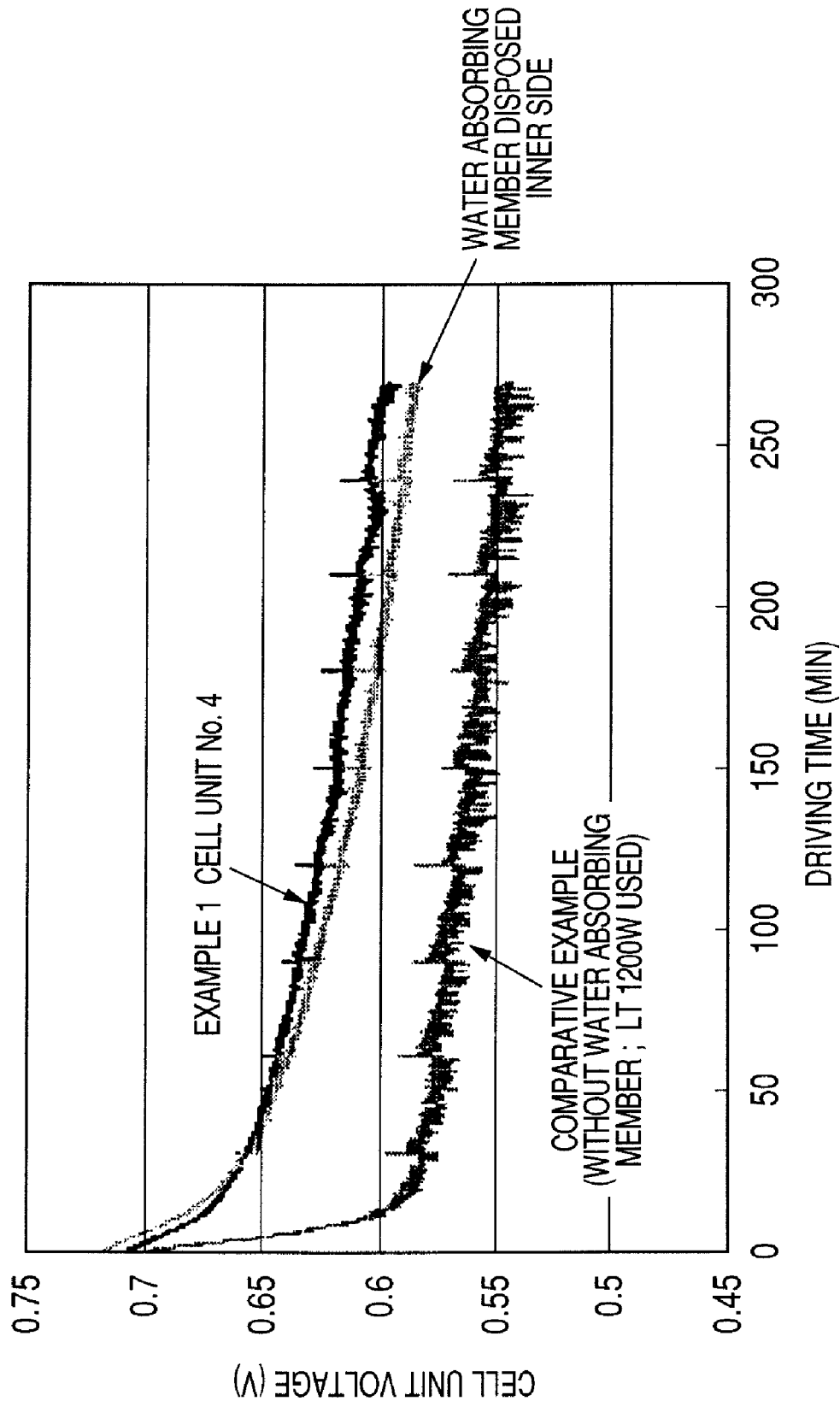
FIG. 17 is a graphical representation illustrating evaluation results of constant current characteristics at a cell unit temperature of 65° C. of fuel cell units in accordance with Example 1 and the Comparative Example.

FIG. 17 illustrates a comparison of the constant current characteristics at a cell unit temperature of 65° C. of the fuel cell unit No. 4 of Example 1, the fuel cell unit of the Comparative Example, and a separately produced fuel cell unit in which both ends of the liquid diffusion nonwoven fabric P type (manufactured by AMBIC Co., Ltd.) are positioned at the inner side of the side surfaces of the metal foam, as shown in FIG. 8, respectively.

In the fuel cell unit in which both ends of the liquid diffusion nonwoven fabric P type (manufactured by AMBIC Co., Ltd.) are positioned at the inner side of the side surfaces of the metal foam as shown in FIG. 8, the length of the liquid diffusion nonwoven fabric P type (manufactured by AMBIC Co., Ltd.) was set to be 5 mm, and both ends thereof were located at the inner inside by 2.5 mm of the side surfaces of the metal foam.

As the oxidizer electrode side gas diffusion layer, carbon cloth with a thickness of about 0.3 mm (LT1200W manufactured by E-TEK) was used.

As illustrated in FIG. 17, the characteristics at high temperatures of the fuel cell unit No. 4 of Example 1 were enhanced compared with those of the fuel cell unit of the Comparative Example. This is considered to be attributable to the high water retention ability of the gas diffusion layer.

Furthermore, in the fuel cell unit in which both ends of the liquid diffusion nonwoven fabric P type (manufactured by AMBIC Co., Ltd.) are positioned at the inner side of the side surfaces of the metal foam as shown in FIG. 8, the characteristics on the high temperature side are similarly enhanced. In Example 1, the fuel cell unit using carbon cloth (LT2500W manufactured by E-TEK) with a thickness of about 0.4 mm exhibited good characteristics. Hence, such fuel cell units were used as the fuel cell units Nos. 4 and 5 and disposed in the central portion of the stack.

However, instead of such a configuration, both ends of the liquid diffusion nonwoven fabric P type (manufactured by AMBIC Co., Ltd.) may be positioned at the inner side of the side surfaces of the metal foam in a cell unit that uses carbon cloth (LT2500W manufactured by E-TEK) with a thickness of about 0.4 mm.

As described above, with the configuration using only the fuel cell units of the Comparative Example, the temperature range in which stable driving can be performed is 55° C. to 60° C. However, by disposing the above-mentioned three kinds of fuel cell units at desirable positions, the temperature range in which stable driving can be performed can be expanded to 40° C. to 65° C.

Thus, even in a fuel cell stack having a temperature distribution, each fuel cell unit can exhibit good characteristics.

Based on the above results, a fuel cell stack having the configuration described in Example 1 was produced and evaluated for characteristics by a galvanodynamic method at a sweep rate of 0.1 mA/s·cm$^2$ and constant current measurement at 400 mA/cm$^2$. Furthermore, a water jacket was attached to a spacer portion of the stack, and a measurement was conducted while the stack was cooled with the flow of cooling water at 40° C.

Figure 18:
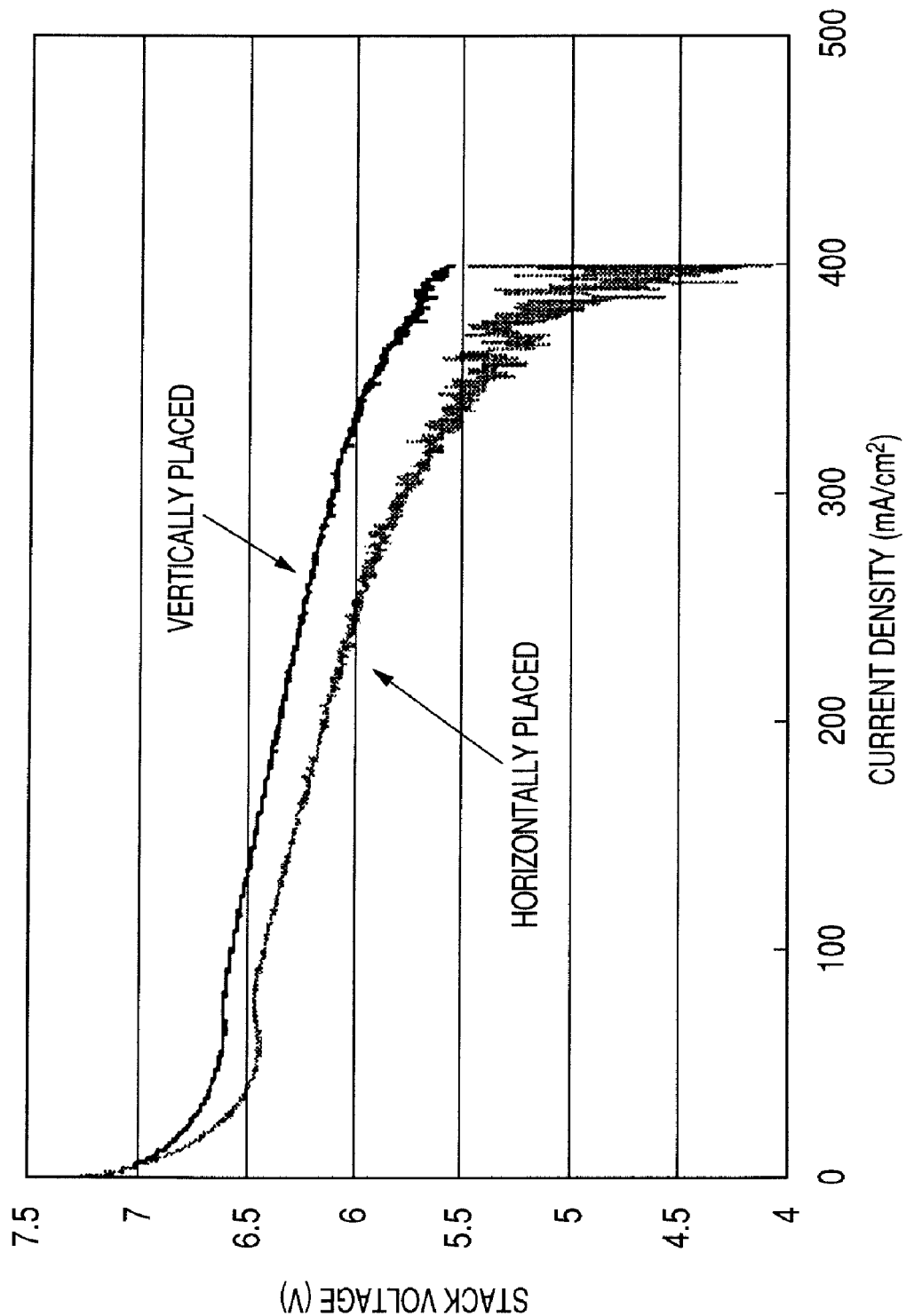
FIG. 18 is a graphical representation illustrating I-V characteristics of a fuel cell stack produced in Example 1.

FIG. 18 illustrates I-V curves obtained by evaluating the stack of Example 1 through a galvanodynamic method when the stack is placed vertically with the stack direction being in the vertical direction and when placed horizontally with the stack direction being in the horizontal direction.

It can be seen from FIG. 18 that in the vertical placement, the characteristics are higher particularly in the high current density region.

This is a phenomenon specific to the case where air is taken in by natural inflow. The air convection is better in the case where the stack is placed vertically with the stack direction being in the vertical direction, and in particular, the characteristics are enhanced in the high current density region.

For this reason, it is desirable to evaluate the stack in the state of being placed vertically. In the case of the vertical displacement, there are a method of placing the fuel cell unit No. 1, i.e., the fuel electrode of the stack at the lower side and a method of placing the fuel cell unit No. 8, i.e., the oxidizer electrode of the stack at the lower side.

Figure 19:
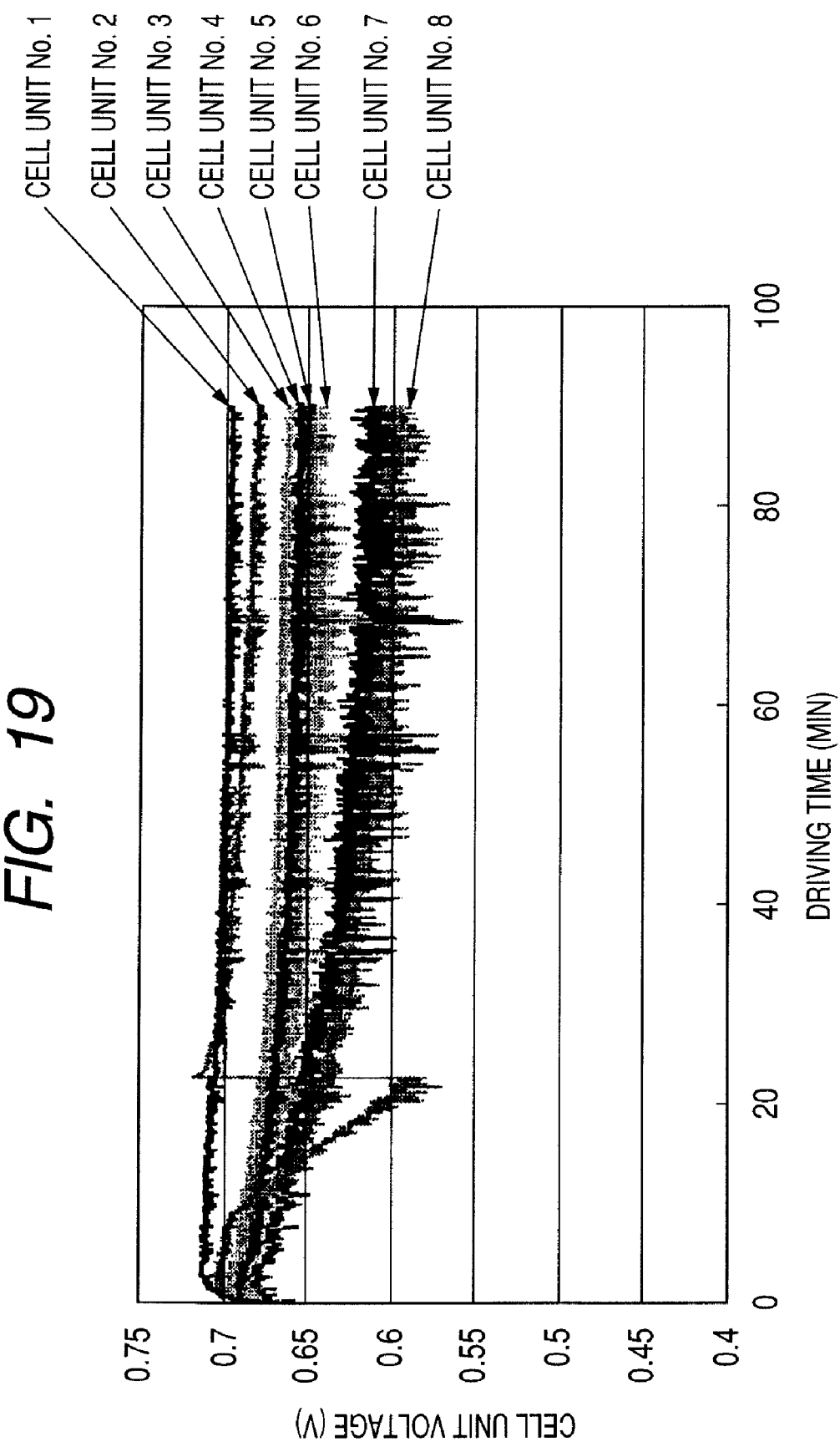
FIG. 19 is a graphical representation illustrating voltages of respective fuel cell units in a constant current measurement, measured in the case where fuel cell unit No. 8 of the fuel cell stack produced in Example 1 is disposed as the uppermost fuel cell unit.
Figure 20:
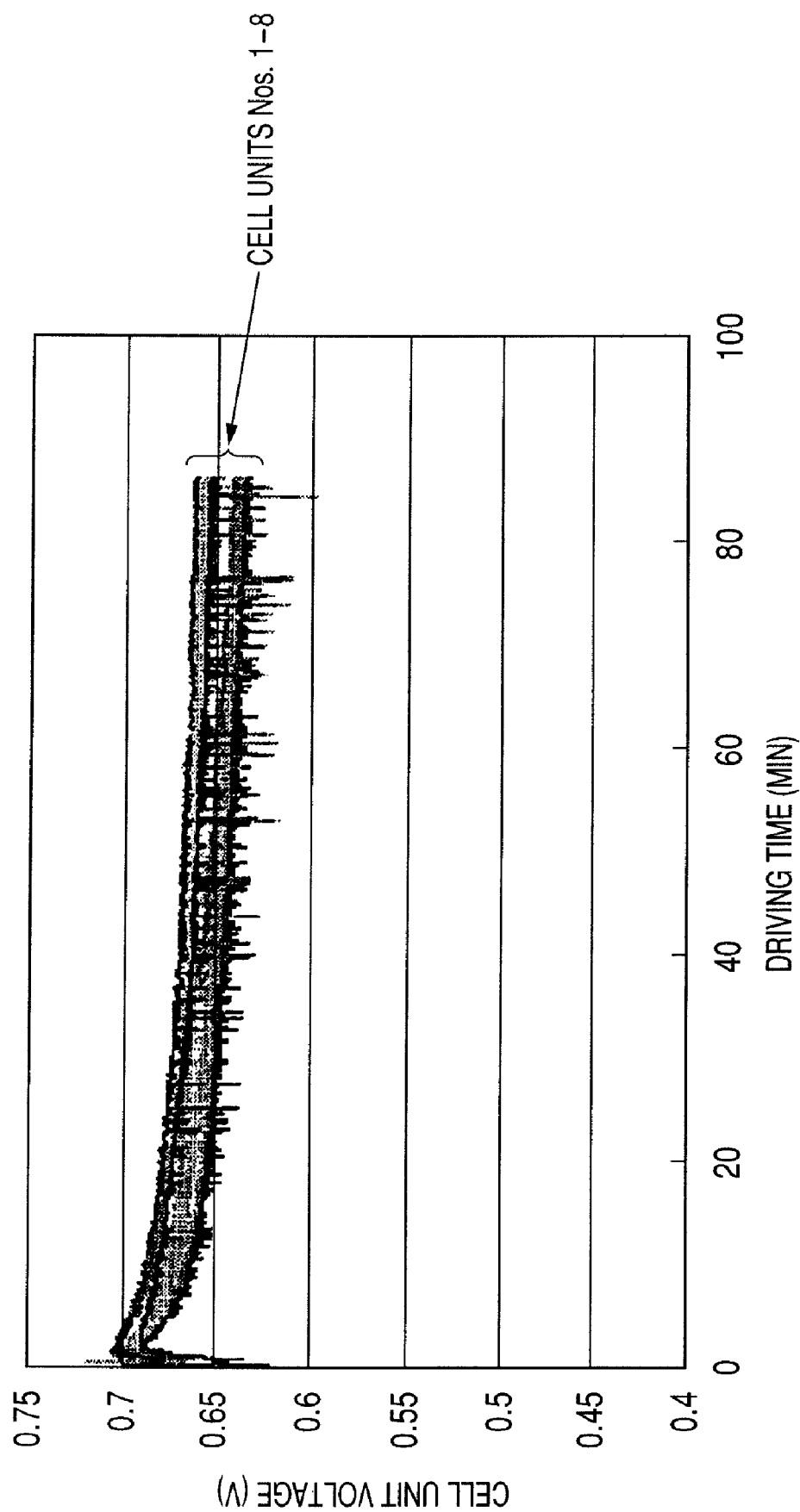
FIG. 20 is a graphical representation illustrating voltages of respective fuel cell units in a constant current measurement, measured in the case where fuel cell unit No. 1 of the fuel cell stack produced in Example 1 is disposed as the uppermost fuel cell unit.

FIG. 19 illustrates the voltages of the respective fuel cell units when the constant current measurement was conducted with the fuel cell unit No. 1 disposed at the lower side, and FIG. 20 illustrates the voltages of the respective fuel cell units when the constant current measurement was conducted with the fuel cell unit No. 8 disposed at the lower side.

In FIG. 19, the voltages of the respective fuel cell units vary considerably, whereas the fuel cell units in FIG. 20 exhibit characteristics substantially similar to each other.

The case where the measurement conducted with the fuel cell unit No. 1 disposed at the lower side as illustrated in FIG. 19 is compared with the case where the measurement is conducted with the fuel cell unit No. 8 disposed at the lower side as illustrated in FIG. 20, the characteristics of, particularly, the uppermost fuel cell unit, i.e., the fuel cell unit No. 8, are considerably degraded, as shown in FIG. 19.

Figure 21:
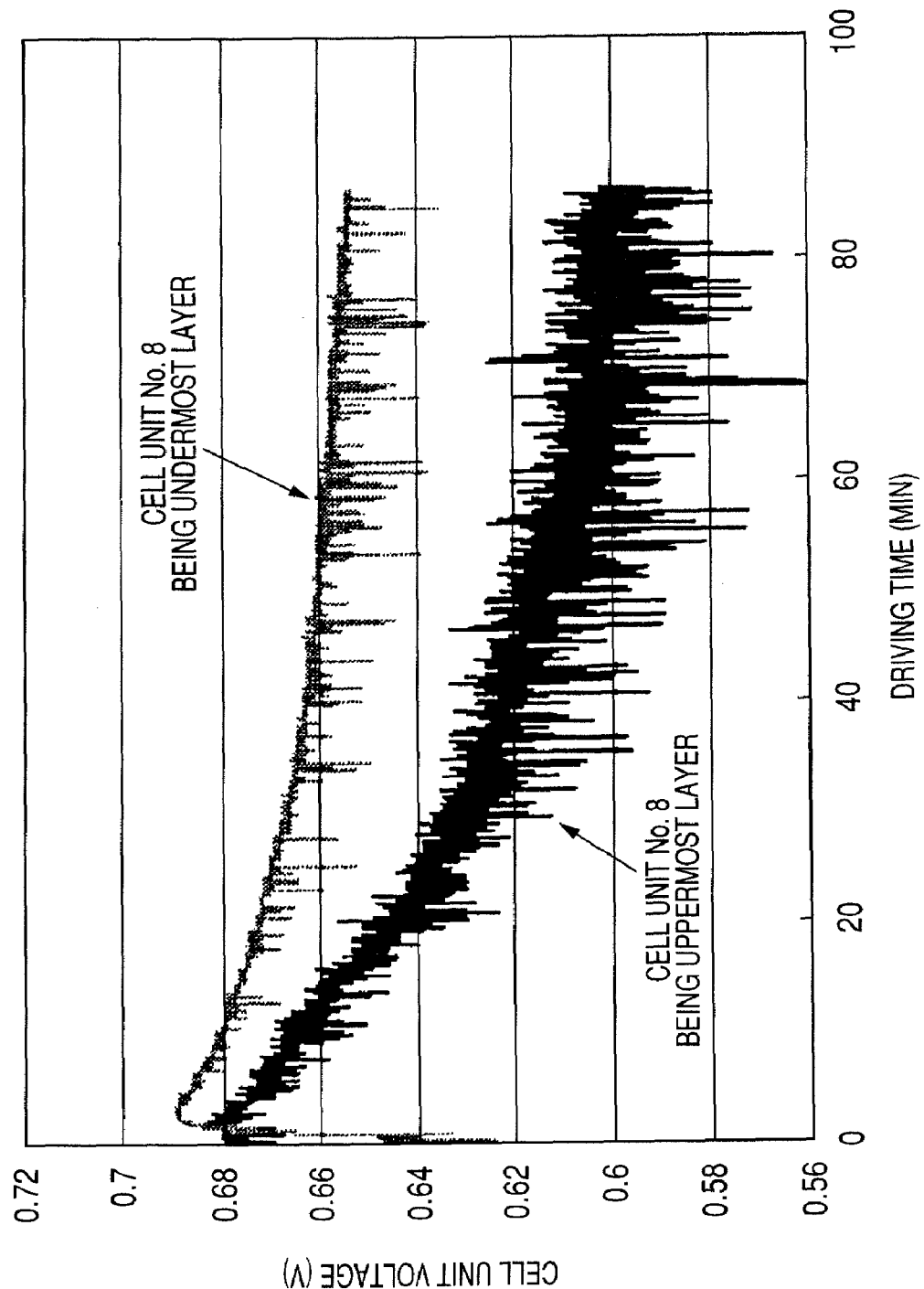
FIG. 21 is a graphical representation illustrating a cell voltage of fuel cell unit No. 8 in a constant current measurement, measured in the case where fuel cell unit No. 8 of the fuel cell stack produced in Example 1 is disposed as the uppermost fuel cell unit and as the undermost fuel cell unit.

FIG. 21 illustrates the results of only the fuel cell unit No. 8 in each arrangement, i.e., in the case where the fuel cell unit No. 8 is used as the uppermost fuel cell unit and the case where the fuel cell unit No. 8 is used as an undermost fuel cell unit.

In the case where the fuel cell unit No. 8 is disposed in the uppermost portion, the voltage is decreased without involving the increase in the electrolyte membrane resistance. Therefore, it is considered that the voltage is decreased by flooding. In contrast, in the case where the fuel cell unit No. 8 is disposed in the undermost portion, the decrease in the voltage is nil or small.

The difference therebetween lies only in the difference in the placement direction of the stack, and hence, the difference in the placement direction is considered to cause the above-mentioned difference. That is, in the case illustrated in FIG. 19, in which the fuel cell unit No. 8 is disposed in the uppermost portion, it is considered that water vapor generated and discharged in the fuel cell unit No. 7 and the lower fuel cell units moves upward, which increases the humidity of the outer periphery of the fuel cell unit No. 8. The transpiration and discharge ability of the water absorbing fibers decreases in a high-humidity atmosphere. Therefore, in the placement of FIG. 19 in which the fuel cell unit No. 8 is disposed in the uppermost fuel cell unit, it is considered that the discharge ability of the fuel cell unit No. 8 decreases to cause flooding.

In contrast, in the placement of FIG. 20, the cell No. 8 is disposed in the undermost layer. Hence, it is considered that the humidity of the outer periphery does not increase and flooding is not caused.

Figure 22:
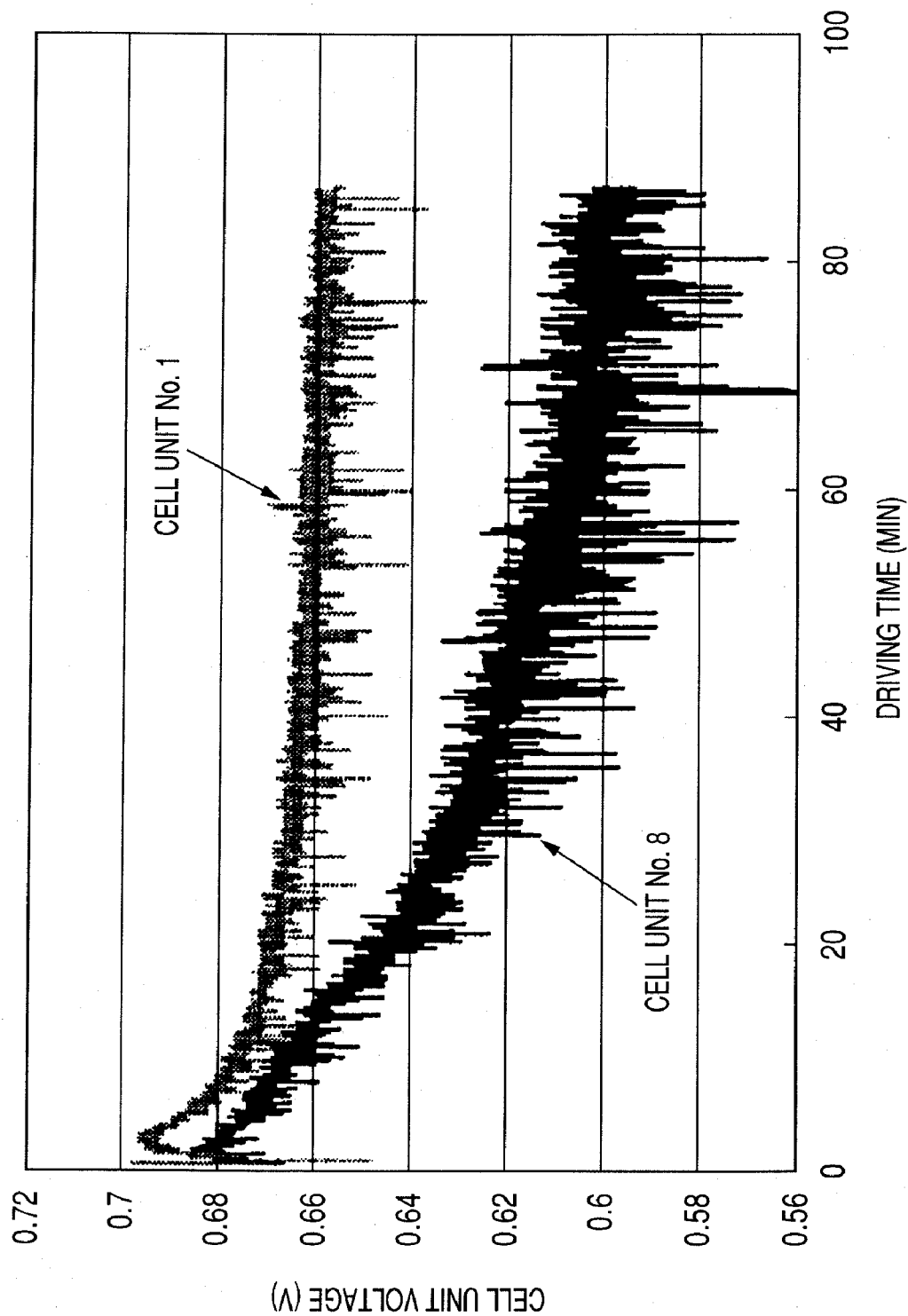
FIG. 22 is a graphical representation illustrating a cell voltage of fuel cell unit No. 1 in a constant current measurement, measured in the case where fuel cell unit No. 1 of the fuel cell stack produced in Example 1 is disposed as the uppermost fuel cell unit, and a cell voltage of fuel cell unit No. 8 in constant a current measurement, measured in the case where fuel cell unit No. 8 of the fuel cell stack produced in Example 1 is disposed as the uppermost fuel cell unit.

Next, FIG. 22 illustrates the voltage behavior of the fuel cell unit No. 8 in the case where the stack is driven with the fuel cell unit No. 8 being disposed as the uppermost fuel cell unit and the voltage behavior of the fuel cell unit No. 1 in the case where the stack is driven with the fuel cell unit No. 1 being disposed as the uppermost fuel cell unit.

That is, the behavior of the fuel cell units Nos. 1 and 8 in the case where the fuel cell units Nos. 1 and 8 are disposed in the uppermost portion, which is the most likely to cause flooding, are compared.

Consequently, the characteristics are largely degraded due to flooding when the fuel cell unit No. 8 is used as the uppermost fuel cell unit. However, a large decrease in voltage is not observed in the fuel cell unit No. 1 compared with that of the fuel cell unit No. 8. The main factor thereof is considered to be the temperatures of the respective fuel cell units during the driving.

Figure 23:
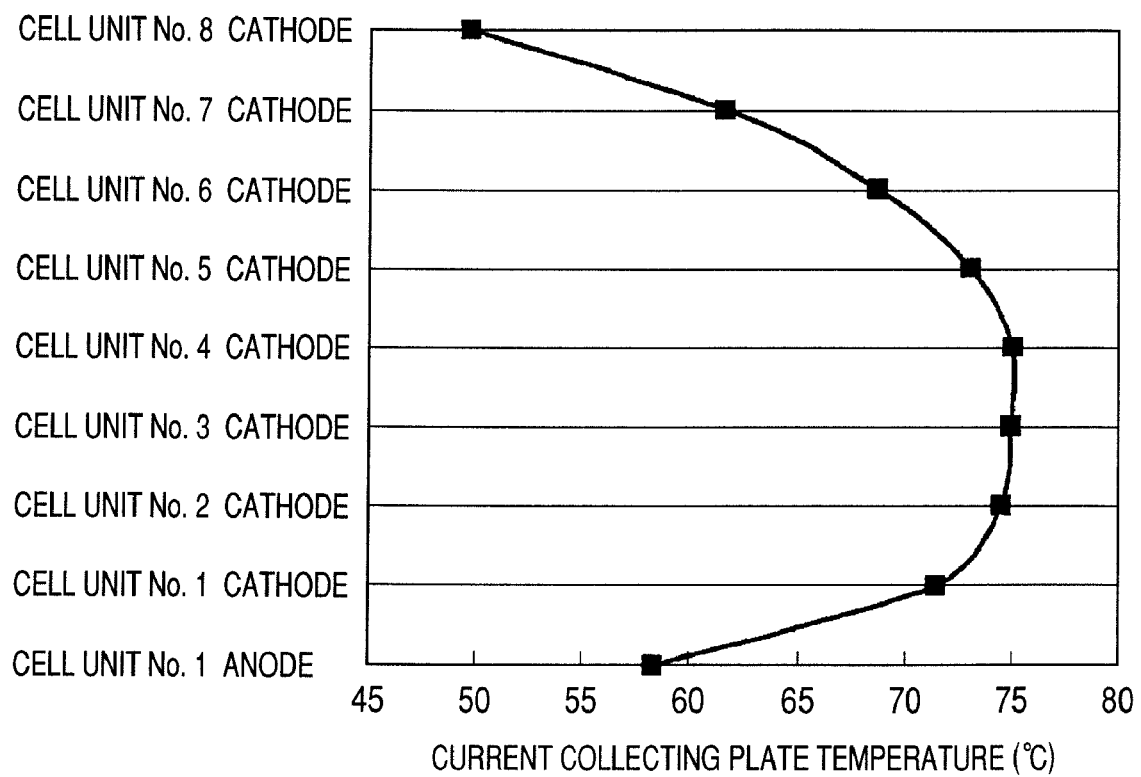
FIG. 23 is a graphical representation illustrating the distribution of temperature during driving at a constant current of the fuel cell stack produced in Example 1.

FIG. 23 illustrates the results obtained by measuring the temperature of the oxidizer electrode (cathode) current collector of each fuel cell unit during constant current driving.

The current collector of each fuel cell unit serves as both the fuel electrode (anode) current collector and the oxidizer electrode (cathode) current collector as is the case where the fuel electrode (anode) current collector of the fuel cell unit No. 8 serves as the oxidizer electrode (cathode) current collector of the fuel cell unit No. 7.

Water is generated by the generation of electrical power on the oxidizer electrode (cathode) side. Hence, the temperature on the oxidizer electrode (cathode) side dominates the determination as to whether flooding and dry-out occur.

Thus, in measuring a temperature, for example, the current collector that serves as both the fuel electrode (anode) current collector of the fuel cell unit No. 8 and the oxidizer electrode (cathode) current collector of the fuel cell unit No. 7 is considered as the oxidizer electrode (cathode) current collector of the fuel cell unit No. 7.

Furthermore, the fuel electrode (anode) of the fuel cell unit No. 1 does not serve as an oxidizer electrode (cathode) of any fuel cell unit, and hence, the fuel electrode (anode) of the fuel cell unit No. 1 is considered as the fuel electrode (anode) of the fuel cell unit No. 1. The temperature increases in the direction of the fuel cell unit located at the central portion, and the temperature decreases in the direction of the fuel cell units located at both ends.

Furthermore, the temperature distribution is substantially symmetrical with respect to the central fuel cell unit.

The reason for this is that the heat is accumulated in the central fuel cell unit to increase the temperature thereof, whereas the end portion fuel cell units are likely to release heat to decrease the temperature thereof. Herein, if the temperatures of the oxidizer electrode (cathode) current collectors of the fuel cell units Nos. 1 and 8, which are the end portion fuel cell units, are compared, it can be seen that the temperature of the oxidizer electrode (cathode) current collector of the fuel cell unit No. 1 is higher.

The reason for this is that the oxidizer electrode (cathode) of the fuel cell unit No. 8 is disposed at an end of the stack and the heat release is accelerated. The oxidizer electrode (cathode) of the fuel cell unit No. 1 is disposed on an inner side while interposing the fuel electrode (anode) of the fuel cell unit No. 1 with respect to the outside, and the heat release is suppressed.

Therefore, even when the fuel cell units are disposed at the ends, the temperature of the oxidizer electrode (cathode) current collector is higher in the fuel cell unit No. 1 and flooding is unlikely to occur therein.

Therefore, even in the case of the placement method of FIG. 20 in which the fuel cell unit No. 1 is disposed in the uppermost portion, a large degradation in the characteristics caused by flooding is not observed.

Furthermore, the temperature distribution of all the fuel cell units is such that the temperature becomes the highest in the fuel cell unit No. 4, which is the central fuel cell unit, and becomes the lowest in the fuel cell unit No. 8, which is the end portion fuel cell unit. The temperature distribution is 49.4° C. to 74.8°, and the temperature difference is 25° C.

Even if there is such a temperature distribution, the voltage distribution after driving of the respective fuel cell units for 90 minutes can be set to be 0.632 V to 0.66 V by driving using the placement method in which the fuel cell unit No. 1 is disposed in the uppermost fuel cell unit as described for FIG. 20. Thus, a fuel cell stack that can perform stable driving can be provided.

Example 2

In this example, a portion of the water absorbing fibers of the fuel cell unit No. 8 extending outside thereof, which is the uppermost fuel cell unit of the stack in Example 1, is brought into contact with the current collector and the end plate.

As illustrated in Example 1, in the case where the stack is driven with the fuel cell unit No. 8 being disposed in the uppermost portion, the humidity in the periphery of the fuel cell unit No. 8 increases, and the transpiration and discharge ability of the water absorbing fibers decreases. As a result, a voltage is largely decreased by flooding.

In this example, the water absorbing fibers of the fuel cell unit No. 8 extending outside thereof are supplied with heat of the current collector and the end plate, whereby the transpiration and the discharge are accelerated even in a high-humidity atmosphere, and flooding is suppressed.

While the constituting members, sizes, and the like of the stack are the same as those in Example 1, only in the disposition method of the water absorbing fibers of the fuel cell unit No. 8, the portion extending as illustrated in FIG. 14 in Embodiment 6 is brought into contact with the current collector and the end plate.

A constant current measurement of a current density of 400 mA/cm² was conducted under the evaluation conditions of natural inflow without using a flow generated by a blower in a windless atmosphere at a temperature of 25° C. and a relative humidity of 50%.

The placement direction of the stack was set such that the fuel cell unit No. 8 was disposed in the uppermost portion, and the cooling temperature was 35° C.

The fuel cell unit No. 8 in Example 2, which was the uppermost fuel cell unit in which flooding was most likely to occur, was compared with that in Example 1. As a result, in Example 1, a voltage was largely decreased by flooding and a voltage after 90 minutes from the start of driving was decreased by 0.341 V compared with the maximum voltage.

In contrast, a decrease in voltage was 0.183 V in Example 2.

The reason for this is that the water absorbing fibers were supplied with the heat of the stack, whereby the transpiration ability and discharge ability were enhanced even in a high-humidity atmosphere, and flooding was suppressed.

Thus, the decrease in voltage of the entire stack was also reduced to 0.723 V in Example 2, whereas the decrease in voltage was 0.873 V in Example 1.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-060570, filed Mar. 11, 2008, which is hereby incorporated by reference herein in its entirety.

What is claimed is:

1. A fuel cell stack comprising a plurality of stacked fuel cell units, each of the fuel cell units comprising a membrane electrode assembly in which a fuel electrode and an oxidizer electrode are disposed on both sides of a polymer electrolyte membrane; an oxidizer flow path forming member, which is disposed on the oxidizer electrode side of the membrane electrode assembly and includes an opening for supplying an oxidizer therethrough; and a separator disposed in contact with a surface opposite to a surface being in contact with the oxidizer electrode of the oxidizer flow path forming member, wherein at least one of the plurality of fuel cell units constituting the fuel cell stack includes a water absorbing member having a surface exposed to the atmosphere in a portion where the oxidizer flow path forming member and the separator are in contact with each other, and wherein an area of the surface exposed to the atmosphere of the water absorbing member of the fuel cell unit whose temperature becomes relatively lower of the plurality of fuel cell units constituting the fuel cell stack is larger than an area exposed to the atmosphere of the water absorbing member of the fuel cell unit whose temperature becomes relatively higher.

2. The fuel cell stack according to claim 1, wherein the fuel cell units located at the both ends, which constitute the fuel cell stack, have an area of a surface exposed to the atmosphere of the water absorbing member, which is larger than that of the fuel cell unit on an inner side constituting the fuel cell stack.

3. The fuel cell stack according to claim 1, wherein the difference in area of the surfaces exposed to the atmosphere corresponds to a difference in area of a portion in which both ends of the water absorbing member protrudes outward from the opening of the oxidizer flow path forming member.

4. The fuel cell stack according to claim 1, wherein the difference in area of the surfaces exposed to the atmosphere corresponds to a difference in area of a portion in which both ends of the water absorbing member are exposed to the atmosphere from the oxidizer flow path forming member in a portion in which the both ends of the water absorbing member are in contact with the separator.

5. The fuel cell stack according to claim 1, wherein the fuel cell unit located on an innermost side, which constitutes the fuel cell stack, is a fuel cell unit in which the water absorbing member is provided on an inner side from both ends on the opening side of the oxidizer flow path forming member.

6. The fuel cell stack according to claim 1, wherein the fuel cell unit on an innermost side, which constitutes the fuel cell stack, is a fuel cell unit in which the water absorbing member is not provided.

7. The fuel cell stack according to claim 1, wherein the oxidizer flow path forming member is formed of a metal foam.

8. The fuel cell stack according to claim 1, wherein the water absorbing member is formed of fibers that have a dry rate of 80% or more, the dry rate being a ratio of water transpired within one hour of water absorbed by the water absorbing member in an atmosphere of temperature of 25° C. and a relative humidity of 50%, and that have a water suction height in 10 seconds of 40 mm or more when an end of the fiber is dipped in water.

9. The fuel cell stack according to claim 1, wherein the water absorbing member disposed in the fuel cell unit in the uppermost portion in a gravity direction is exposed outside of the fuel cell unit and is in contact with a stack constituting member whose temperature becomes higher than an outside temperature.

10. A fuel cell stack comprising a plurality of stacked fuel cell units, each of the fuel cell units comprising a membrane electrode assembly in which a fuel electrode and an oxidizer electrode are disposed on both sides of a polymer electrolyte membrane; an oxidizer flow path forming member, which is disposed on the oxidizer electrode side of the membrane electrode assembly and includes an opening for supplying an oxidizer therethrough; and a separator disposed in contact with a surface opposite to a surface being in contact with the oxidizer electrode of the oxidizer flow path forming member, wherein at least one of the plurality of fuel cell units constituting the fuel cell stack includes a water absorbing member having a surface exposed to the atmosphere in a portion where the oxidizer flow path forming member and the separator are in contact with each other, and wherein the fuel cell units located at the both ends of the plurality of fuel cell units constituting the fuel cell stack have an area of a surface exposed to the atmosphere of the water absorbing member, which is larger than that of the fuel cell unit located on an inner side of the plurality of fuel cell units constituting the fuel cell stack.

* * * * *